United States Patent
Xiong et al.

(10) Patent No.: US 11,039,466 B2
(45) Date of Patent: Jun. 15, 2021

(54) USER EQUIPMENT (UE), EVOLVED NODE-B (ENB) AND METHODS FOR MULTIPLEXING NEW RADIO (NR) PHYSICAL UPLINK SHARED CHANNEL (NR PUSCH) AND NR PHYSICAL UPLINK CONTROL CHANNEL (NR PUCCH)

(71) Applicant: Apple Inc., Cupertino, CA (US)

(72) Inventors: Gang Xiong, Beaverton, OR (US); Joonyoung Cho, Santa Clara, CA (US); Hong He, Beijing (CN); Hwan-Joon Kwon, Portland, OR (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 16/322,040

(22) PCT Filed: Aug. 30, 2017

(86) PCT No.: PCT/US2017/049296
§ 371 (c)(1),
(2) Date: Jan. 30, 2019

(87) PCT Pub. No.: WO2018/080629
PCT Pub. Date: May 3, 2018

(65) Prior Publication Data
US 2019/0191453 A1    Jun. 20, 2019

Related U.S. Application Data

(60) Provisional application No. 62/414,474, filed on Oct. 28, 2016.

(51) Int. Cl.
*H04W 4/00*    (2018.01)
*H04W 72/12*    (2009.01)
(Continued)

(52) U.S. Cl.
CPC ......... *H04W 72/1289* (2013.01); *H04L 1/00* (2013.01); *H04L 5/0037* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 2014/0177572 A1 | 6/2014 | Papasakellariou et al. |
| 2016/0227536 A1* | 8/2016 | Khawer ............ H04W 72/1215 |

(Continued)

OTHER PUBLICATIONS

NTT Docomo, Initial views on UL control channel design, Oct. 10-14, 2016, 3GPP TSG RAN WG1 R1-1610083 (Year: 2016).*

(Continued)

*Primary Examiner* — Siren Wei
(74) *Attorney, Agent, or Firm* — Kowert Hood Munyon Rankin and Goetzel PC

(57) ABSTRACT

Embodiments of a User Equipment (UE), Evolved Node-B (eNB) and methods for communication are generally described herein. The UE may receive downlink control information (DCI) that indicates an allocation for a new radio (NR) physical uplink shared channel (NR PUSCH) transmission, by the UE, in a channel of multiple physical resource blocks (PRBs) in a slot that comprises: a predetermined data region, and a predetermined control region reserved for NR physical uplink control channel (NR PUCCH) transmissions. The DCI may be configurable to indicate whether the allocation includes one or more of the PRBs in the control region. The allocation may include one or more of the PRBs in one or more symbol periods in the data region and may be configurable to include one or more of the PRBs in one or more symbol periods in the control region.

20 Claims, 15 Drawing Sheets

(51) Int. Cl.
*H04L 5/00* (2006.01)
*H04L 1/00* (2006.01)
*H04W 72/04* (2009.01)

(52) U.S. Cl.
CPC .......... *H04L 5/0044* (2013.01); *H04L 5/0051* (2013.01); *H04L 5/0053* (2013.01); *H04L 5/0055* (2013.01); *H04L 5/0057* (2013.01); *H04W 72/0406* (2013.01); *H04W 72/1268* (2013.01); *H04L 5/0023* (2013.01)

(56) References Cited

U.S. PATENT DOCUMENTS

| | | | |
|---|---|---|---|
| 2017/0367046 A1* | 12/2017 | Papasakellariou | H04L 5/0048 |
| 2018/0027553 A1* | 1/2018 | Matsumoto | H04W 16/32 |
| | | | 370/336 |
| 2018/0097609 A1* | 4/2018 | Tiirola | H04L 5/143 |
| 2018/0098321 A1* | 4/2018 | Chae | H04W 56/0015 |
| 2018/0115984 A1* | 4/2018 | Sahlin | H04W 72/14 |
| 2019/0335493 A1 | 10/2019 | Xiong et al. | |

OTHER PUBLICATIONS

"Discussion on slot structure and channel format", Mediatek Inc. 3GPP TSG RAN WG1 Meeting #86bis Lisbon Portugal, See sections 1-2.3 and figure 1, (Oct. 1, 2016).

"Initial views on UL control channel design", NTT Docomo Inc. R1-1610083 3GPP TSG RAN WG1 Meeting #86bis Lisbon Portugal, See sections 2-2.2, (Oct. 1, 2016).

"International Application Serial No. PCT/US2017/049296, International Search Report dated Nov. 10, 2017", 3 pgs.

"International Application Serial No. PCT/US2017/049296, Written Opinion dated Nov. 10, 2017", 8 pgs.

"Signaling of Slot Structure", Samsung, R1-1609127 3GPP TSG RAN WG1 #86bis Lisbon Portugal, (Sep. 30, 2016).

Nokia, et al., "On the UL control channel structure for NR", R1-1609740, 3GPP TSG-RAN WG1 #86bis Lisbon Portugal, (Oct. 1, 2016).

"International Application Serial No. PCT US2017 049296, International Preliminary Report on Patentability dated May 9, 2019", 10 pgs.

"U.S. Appl. No. 16/407,961, Preliminary Amendment filed Jul. 24, 2019", 7 pgs.

* cited by examiner

USER EQUIPMENT (UE), EVOLVED NODE-B (ENB) AND METHODS FOR MULTIPLEXING NEW RADIO (NR) PHYSICAL UPLINK SHARED CHANNEL (NR PUSCH) AND NR PHYSICAL UPLINK CONTROL CHANNEL (NR PUCCH)

PRIORITY CLAIM

This application is a U.S. National Stage Filing under 35 U.S.C. 371 from International Application No. PCT/US2017/039684, filed Jun. 28, 2017 and published in English as WO 2018/080602 on May 3, 2018, which claims the benefit of priority to U.S. Provisional Patent Application Ser. No. 62/414,474, filed Oct. 28, 2016, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to multiplexing of data and control information, including but not limited to multiplexing of NR physical uplink shared channel (NR PUSCH) transmissions and NR physical uplink control channel (PUCCH) transmissions.

BACKGROUND

Base stations and mobile devices operating in a cellular network may exchange data. In some cases, time resources and/or frequency resources may be allocated for multiplexing of data and control information in a frame. In some scenarios, an application used by the mobile device may operate with a relatively high data rate. Support of such a data rate may utilize a significant portion of a system data rate supported by the base station, and may even exceed the supported data rate in some cases. Operations such as multiplexing of data and control and other operations may become challenging when such data rates are used. For instance, new radio (NR) networks may support data rates that are significantly higher than Fourth Generation (4G) systems and other cellular systems. Accordingly, there is a general need for methods of multiplexing data and control information in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
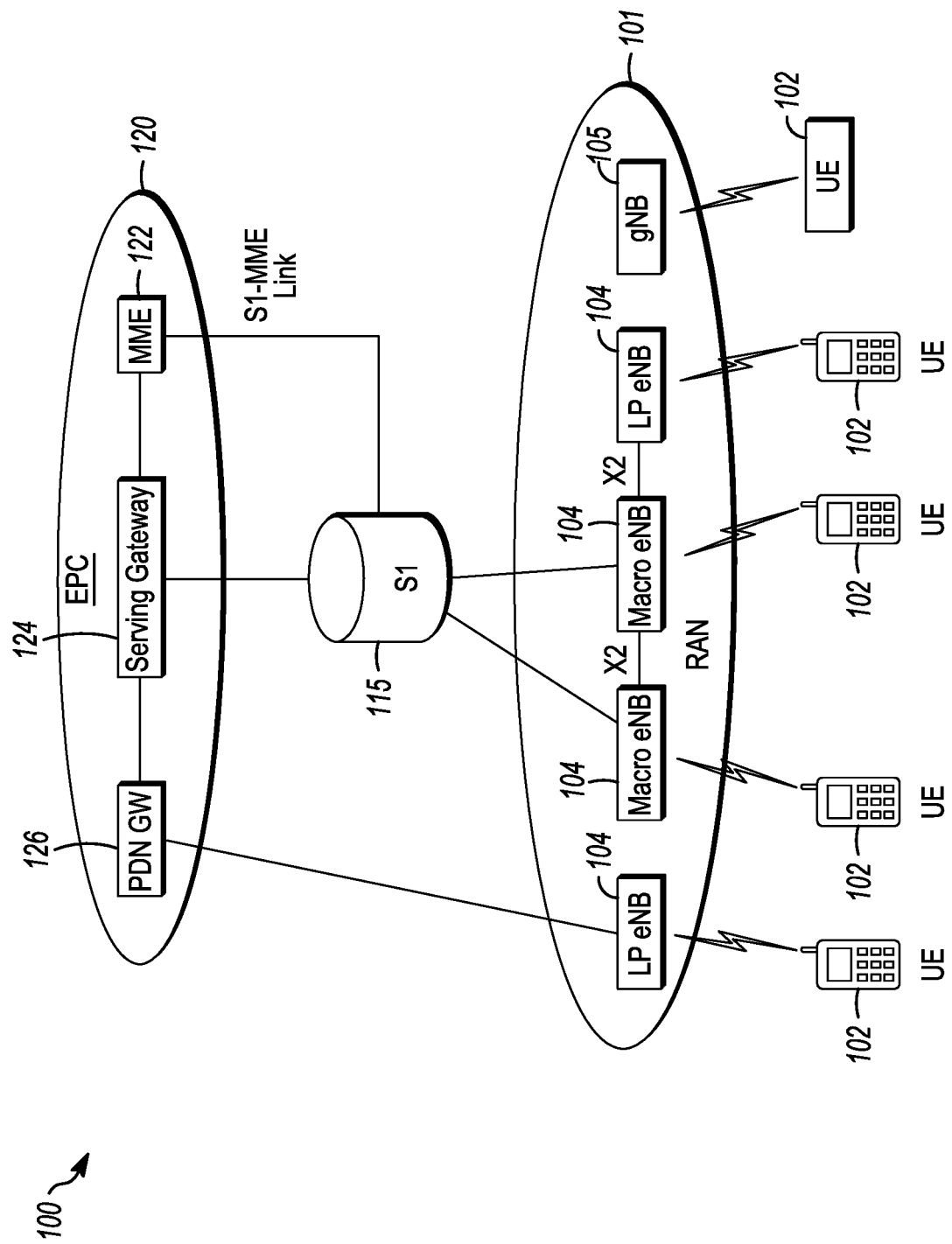
FIG. 1 is a functional diagram of an example network in accordance with some embodiments.

FIG. 1 is a functional diagram of an example network in accordance with some embodiments. In some embodiments, the network 100 may be a Third Generation Partnership Project (3GPP) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1. Some embodiments may not necessarily include all components shown in FIG. 1, and some embodiments may include additional components not shown in FIG. 1.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1 or the number of gNBs 105 shown in FIG. 1. In some embodiments, the network 100 may not necessarily include eNBs 104. Embodiments are also not limited to the connectivity of components shown in FIG. 1.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by an eNB 104 are not limiting. In some embodiments, one or more of those operations, techniques and/or methods may be practiced by a gNB 105 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
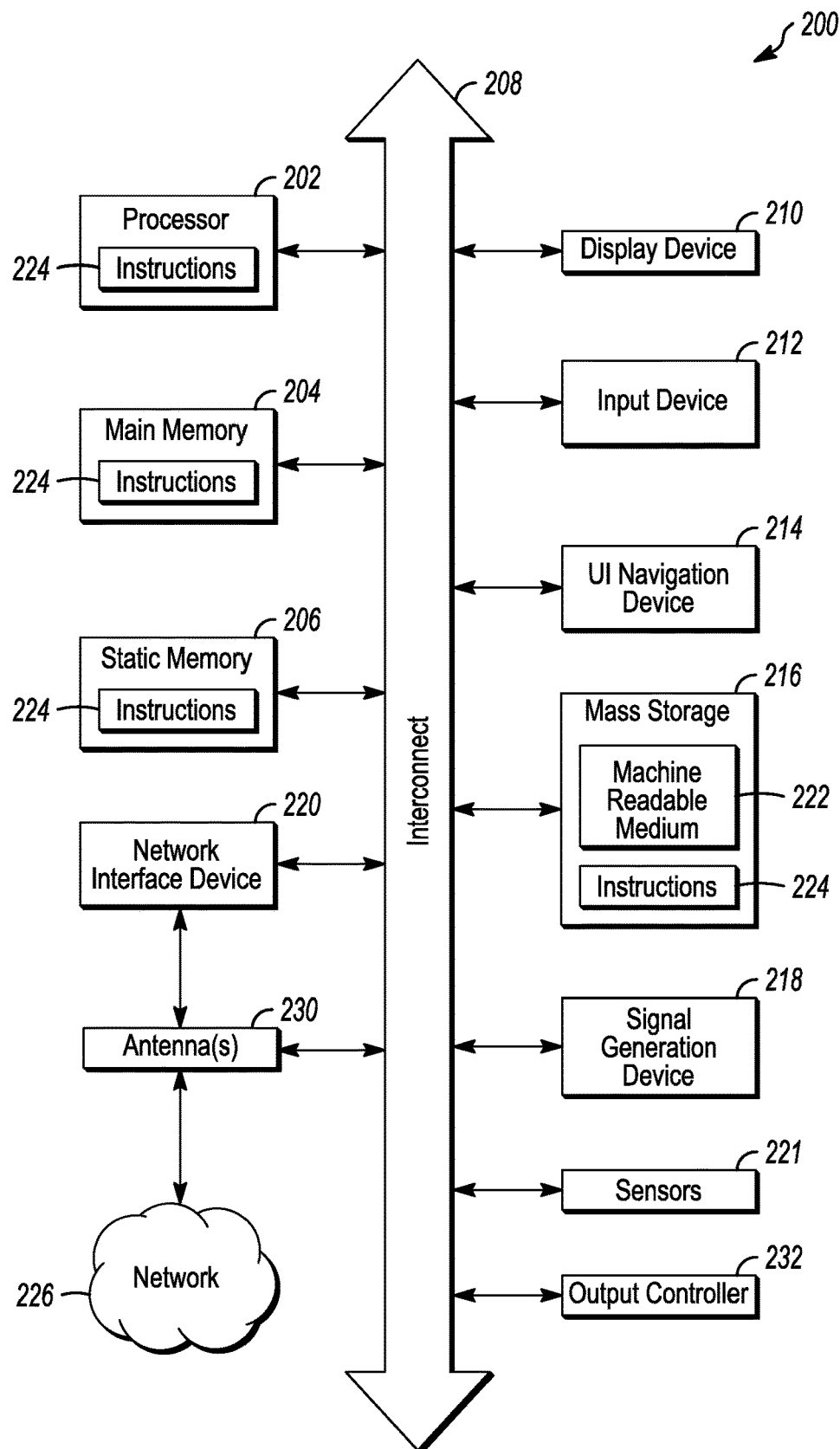
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
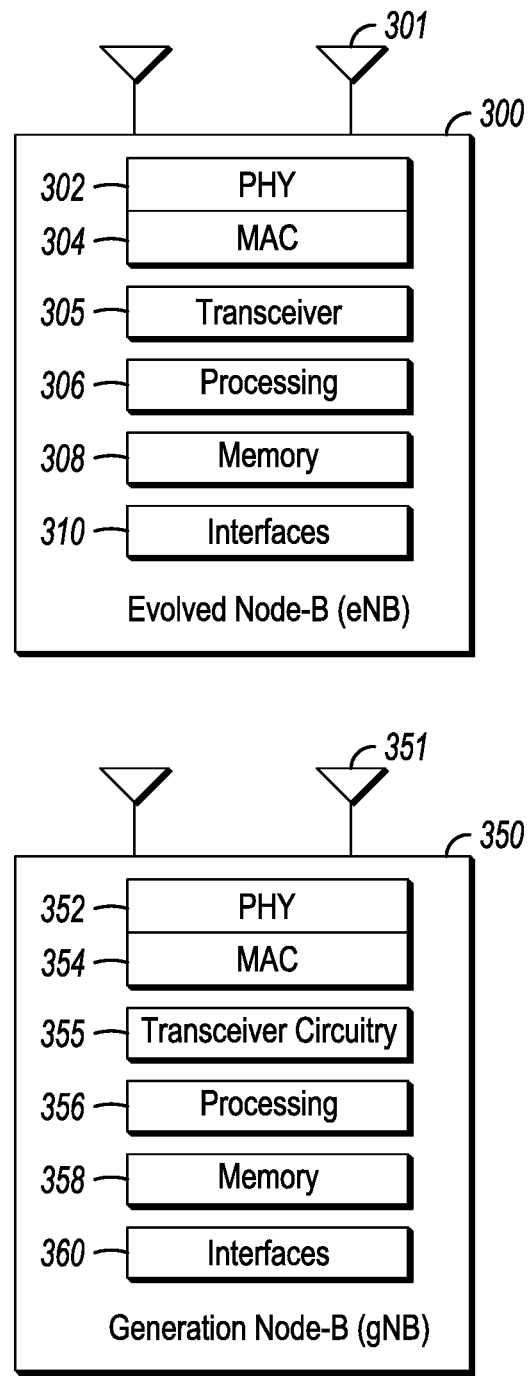
FIG. 3 illustrates a block diagram of an Evolved Node-B (eNB) in accordance with some embodiments and a block diagram of a Generation Node-B (gNB) in accordance with some embodiments.

FIG. 3 illustrates a block diagram of an Evolved Node-B (eNB) in accordance with some embodiments and a block diagram of a Generation Node-B (gNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), gNBs 105, components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 (such as in 300) or both.

It should be noted that in some embodiments, the gNB 350 may be a stationary non-mobile device. The gNB 350 may be suitable for use as a gNB 105 as depicted in FIG. 1. The gNB 350 may include physical layer circuitry 352 and a transceiver 355, one or both of which may enable transmission and reception of signals to and from the UE 200, eNBs, other gNBs, other UEs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The gNB 350 may also include MAC circuitry 354 for controlling access to the wireless medium. The gNB 350 may also include processing circuitry 356 and memory 308 arranged to perform the operations described herein. The gNB 350 may also include one or more interfaces 360, which may enable communication with other components, including other gNBs 105 (FIG. 1), eNBs 104 (FIG. 1), components in the EPC 120 (FIG. 1) or other network components. In addition, the interfaces 360 may enable communication with other components that may not be shown in FIG. 1, including components external to the network. The interfaces 360 may be wired or wireless or a combination thereof. It should be noted that in some embodiments, a gNB or other base station may include some or all of the components shown in either FIG. 2 or FIG. 3 (such as in 350) or both.

Figure 4:
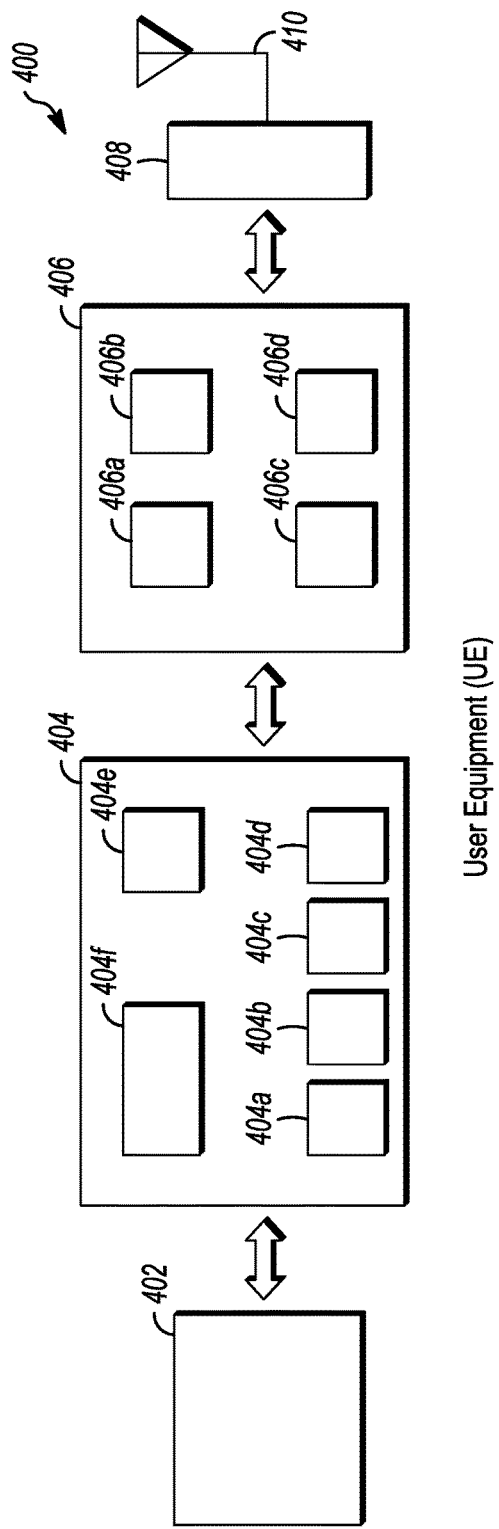
FIG. 4 illustrates a block diagram of a User Equipment (UE) in accordance with some embodiments.

FIG. 4 illustrates a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, a "transceiver" and/or "transceiver circuitry" may include one or more elements and/or components, some or all of which may be included in the RF circuitry 406 and/or the FEM circuitry 408. These examples are not limiting, however, as the processing circuitry, transceiver and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.).

The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

One or more of the antennas 230, 301, 351, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas 230, 301, 351, 410 may be effectively separated to take advantage of spatial diversity and the different channel characteristics that may result.

In some embodiments, the UE 400 and/or the eNB 300 and/or gNB 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 and/or eNB 300 and/or gNB 350 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300, gNB 350 and/or other device may include one or more of a keyboard, a display, a non-volatile memory port, multiple antennas, a graphics processor, an application processor, speakers, and other mobile device elements. The display may be an LCD screen including a touch screen.

Although the UE 400, the eNB 300 and the gNB 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 400 and/or eNB 300 and/or gNB 350 and/or machine 200 may include various components of the UE 400 and/or the eNB 300 and/or the gNB 350 and/or the machine 200 as shown in FIGS. 2-4. Accordingly, techniques and operations described herein that refer to the UE 400 (or 102) may be applicable to an apparatus for a UE. In addition, techniques and operations described herein that refer to the eNB 300 (or 104) may be applicable to an apparatus for an eNB. In addition, techniques and operations described herein that refer to the gNB 350 (or 105) may be applicable to an apparatus for a gNB.

In accordance with some embodiments, the UE 102 may decode downlink control information (DCI) that indicates an allocation for a new radio (NR) physical uplink shared channel (NR PUSCH) transmission, by the UE 102, in a channel of multiple physical resource blocks (PRBs) in a slot that comprises: a predetermined data region of one or more symbol periods, and a predetermined control region of one or more symbol periods reserved for NR physical uplink control channel (NR PUCCH) transmissions. The DCI may be configurable to indicate whether the allocation includes one or more of the PRBs in the control region. The UE 102 may store at least a portion of the DCI in memory. The UE 102 may determine the allocation based on the DCI. The allocation may include one or more of the PRBs in one or more of the symbol periods of the data region. The allocation may be configurable to include one or more of the PRBs in one or more of the symbol periods of the control region. These embodiments are described in more detail below.

Figure 5:
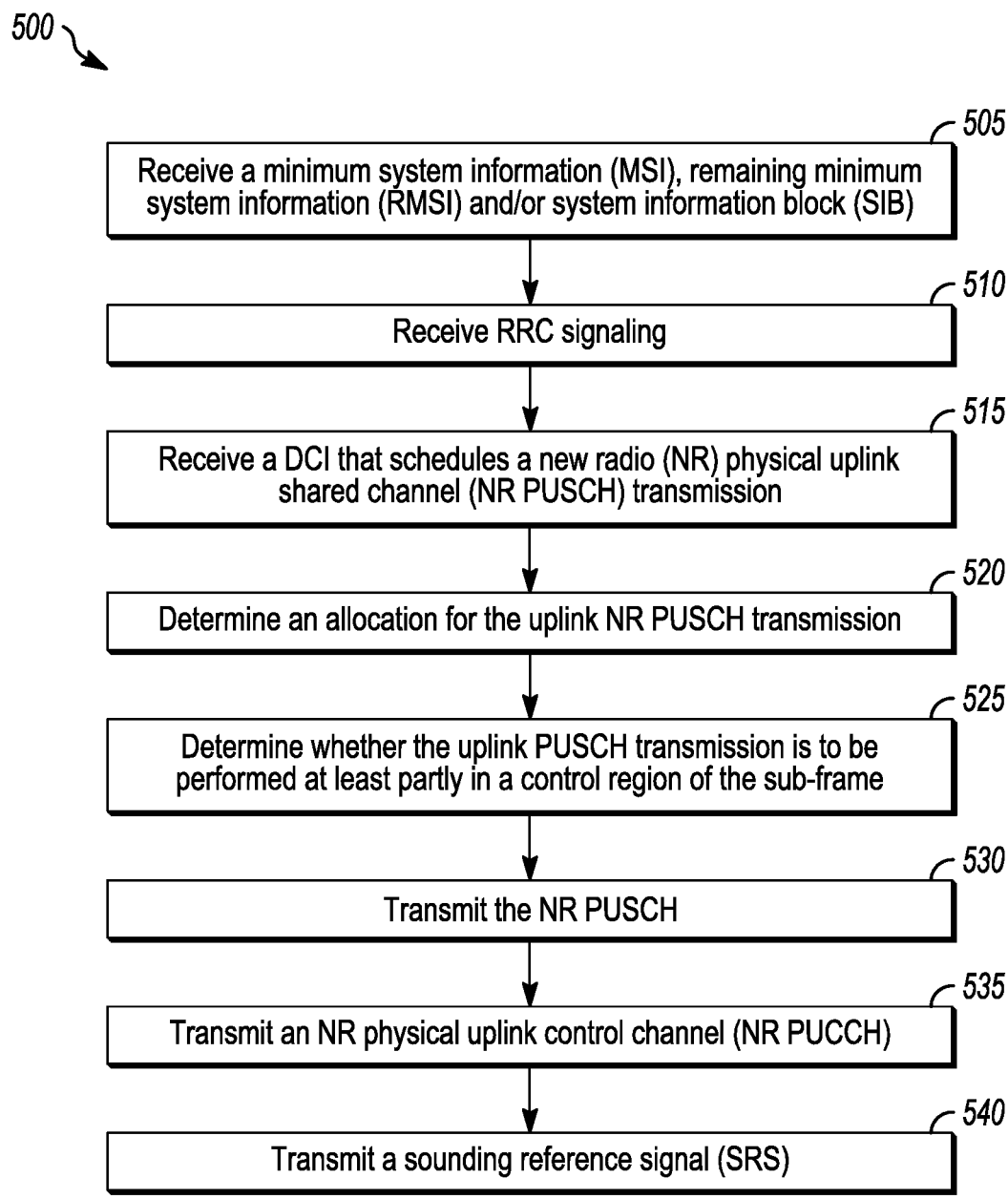
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-19, although it is understood that the method 500 may be practiced with any other suitable systems, interfaces and components.

In some embodiments, a UE 102 may perform one or more operations of the method 500, but embodiments are not limited to performance of the method 500 and/or operations of it by the UE 102. In some embodiments, the eNB 104 and/or gNB 105 may perform one or more operations of the method 500 (and/or similar operations). Accordingly, although references may be made to performance of one or more operations of the method 500 by the UE 102 in descriptions herein, it is understood that the eNB 104 and/or gNB 105 may perform the same operation(s), similar operation(s) and/or reciprocal operation(s), in some embodiments.

In addition, while the method 500 and other methods described herein may refer to eNBs 104, gNBs 105 or UEs 102 operating in accordance with 3GPP standards, 5G standards and/or other standards, embodiments of those methods are not limited to just those eNBs 104, gNBs 105 or UEs 102 and may also be practiced on other devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 500 and 600 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 505, the UE 102 may receive one or more minimum system information (MSI), may receive one or more remaining minimum system information (RMSI), and/or may receive one or more system information blocks (SIBs). At operation 510, the UE 102 may receive radio resource control (RRC) signaling. The RRC signaling, MSI(s), RMSI(s) and/or SIB(s) may include various information, including but not limited to information related to time resource(s) and/or frequency resource(s) for a data region of one or more slots, information related to time resource(s) and/or frequency resource(s) for a control region of one or more slots, information related to multiplexing of the data region and control region in one or more slots and/or other information. These examples will be described in more detail below. It should be noted that embodiments are not limited to usage of RRC signaling, MSI(s), RMSI(s) and/or SIB(s) to communicate such information, as other signaling, messages, blocks and/or other elements may be used, in some embodiments. For instance, a master information block (MIB) may be used in some embodiments.

In some embodiments, the RRC signaling, MSI(s), RMSI(s) and/or SIB(s) may be received from an eNB 104, although the scope of embodiments is not limited in this respect. In some embodiments, the RRC signaling, MSI(s), RMSI(s) and/or SIB(s) may be received from a gNB 105, although the scope of embodiments is not limited in this respect. In some embodiments, the RRC signaling, MSI(s), RMSI(s) and/or SIB(s) may be received from another base station component and/or other component.

It should be noted that some embodiments may not necessarily include all operations shown in FIG. 5. In some embodiments, the UE 102 may perform one of operations 505-510 but may not necessarily perform both operations 505-510. In some embodiments, the UE 102 may perform both of operations 505-510.

At operation 515, the UE 102 may receive downlink control information (DCI). At operation 520, the UE 102 may determine an allocation for an uplink new radio (NR) physical uplink shared channel PUSCH transmission. At operation 525, the UE 102 may determine whether the uplink NR PUSCH transmission is to be performed at least partly in the control region of the slot. It should be noted that operation 525 may be included as part of operation 520 in some embodiments, although the scope of embodiments is not limited in this respect. Operations 525 and 520 may be performed jointly and/or together, in some embodiments, although the scope of embodiments is not limited in this respect.

In some embodiments, the DCI may schedule an uplink NR PUSCH transmission by the UE 102. In some embodiments, the DCI may indicate an allocation for an NR PUSCH transmission by the UE 102.

In some embodiments, an NR PUSCH transmission may be performed in a channel of multiple physical resource blocks (PRBs). In some embodiments, an NR PUSCH transmission may be performed in a slot that comprises: a predetermined data region of one or more symbol periods, and a predetermined control region of one or more symbol periods reserved for NR physical uplink control channel (NR PUCCH) transmissions. In a non-limiting example, OFDMA and/or OFDM and/or DFT-s-OFDM may be employed, and an allocation may include one or more OFDM symbol periods and one or more PRBs, resource elements (REs), resource blocks (RBs), sub-channels, sub-carriers and/or other frequency resource unit.

In another non-limiting example, the allocation may include one or more of the PRBs in one or more of the symbol periods of the data region. The allocation may be configurable to include one or more of the PRBs in one or more of the symbol periods of the control region.

In some embodiments, for the allocation: the PRBs included in the data region may be first PRBs, the PRBs included in the control region may be second PRBs, and the allocation may be configurable for first PRBs and second PRBs that are the same. In some embodiments, for the allocation: the PRBs included in the data region may be first PRBs, the PRBs included in the control region may be second PRBs, and the allocation may be configurable for first PRBs and second PRBs that are different. In some embodiments, for the allocation: the PRBs included in the data region may be first PRBs, the PRBs included in the control region may be second PRBs, and the allocation may be configurable for first PRBs and second PRBs that are either the same or different. For instance, the allocation may be configurable to use the same PRBs in the data and control regions in some cases, and may be further configurable to use different PRBs in the data and control regions in other cases.

The DCI may include information related to an NR PUSCH transmission, including but not limited to an allocation for the NR PUSCH transmission (which may be in terms of time resources, frequency resources and/or other), time resources for the NR PUSCH transmission, frequency resources for the NR PUSCH transmission, a modulation and coding scheme (MCS) for the NR PUSCH transmission, a number of bits, bytes and/or other to be encoded for the NR PUSCH transmission, a number of symbols (such as starting symbols and symbol periods, OFDM symbol periods and/or other) and/or other. In some embodiments, the UE 102 may determine information related to the NR PUSCH transmission (and/or other information) based at least partly on information included in the DCI.

In some embodiments, the DCI may be configurable to indicate whether the allocation includes one or more of the PRBs in the control region. In a non-limiting example, one or more bits may be used to indicate such information.

In some embodiments, the DCI may include a bitmap. Bit positions of the bitmap may be mapped to at least some of the PRBs in accordance with a predetermined mapping. Values of the bit positions of the bitmap may indicate whether corresponding PRBs are reserved for the NR PUCCH transmissions in the control region.

In some embodiments, the DCI may include and/or indicate a start PRB or an end PRB. The UE 102 may determine, based at least partly on the start PRB or the end PRB, the one or more PRBs in the control region for the allocation. In some embodiments, the DCI may indicate a range of PRBs for which NR PUSCH transmissions are permissible in the control region. For the allocation, the PRBs included in the data region may be first PRBs. The UE 102 may determine, for the allocation, second PRBs for the control region based at least partly on an intersection between the first PRBs and the range of PRBs indicated in the DCI.

In some embodiments, the DCI may include an end symbol for the allocation for the NR PUSCH transmission. The UE 102 may determine that the NR PUSCH transmission is to be performed at least partly in the control region if the end symbol for the allocation is included in the control region.

In some embodiments, the UE 102 may determine, based on the DCI, the allocation for the NR PUSCH transmission to include contiguous first PRBs in contiguous symbol periods of the data region. The UE 102 may further determine the allocation to include, if the indicator of the DCI indicates that the NR PUSCH transmission is to be performed at least partly in the control region, contiguous second PRBs in one or more contiguous symbol periods of the control region. Embodiments are not limited to contiguous symbol periods or to contiguous PRBs.

In some embodiments, the DCI may include a bitmap. Bit positions of the bitmap may be mapped to at least some of the PRBs in accordance with a predetermined mapping. Values of the bit positions of the bitmap may indicate whether corresponding PRBs are to be included in the allocation in the control region.

At operation 530, the UE 102 may transmit the NR PUSCH. In some embodiments, the UE 102 may perform an NR PUSCH transmission. In some embodiments, the UE 102 may perform a data transmission. It should be noted that transmission of the NR PUSCH, the NR PUSCH transmission and/or data transmission may be performed in accordance with the determined allocation, in some embodiments.

At operation 535, the UE 102 may transmit one or more NR PUCCHs. In some embodiments, the UE 102 may perform one or more NR PUCCH transmissions. In some embodiments, the UE 102 may perform a control transmission. In some embodiments, the UE 102 may transmit control element(s) and/or control information. It should be noted that transmission of the NR PUCCH(s), the NR PUCCH transmission(s), control transmission(s) and/or transmission(s) of control information may be performed in accordance with the determined allocation, in some embodiments.

At operation 540, the UE 102 may transmit one or more sounding reference signals (SRSs). In some embodiments, the UE 102 may perform one or more SRS transmissions. In some embodiments, the UE 102 may transmit one or more sounding elements. It should be noted that transmission of the SRSs, the SRS transmission(s), and/or transmission(s) of the sounding element(s) may be performed in accordance with the determined allocation, in some embodiments.

In some embodiments, the UE 102 may determine, based on the DCI or RRC signalling or a combination thereof, a division of the PRBs in the one or more symbols of the control region to include: first PRBs for NR PUCCH transmission(s), and second PRBs for sounding reference signal (SRS) transmission(s). The UE 102 may transmit an SRS in the control region in at least one of the second PRBs. The UE 102 may encode data bits to generate the NR PUSCH transmission in accordance with the allocation.

In some embodiments, the UE 102 may decode a control indicator for which: a first value indicates that the UE 102 is to refrain from new radio (NR) physical uplink shared channel (NR PUSCH) transmissions in control regions of a plurality of slots. The slots may comprise data regions and control regions. A second value may indicate that the NR PUSCH transmissions are permissible in the control regions in the slots. The UE 102 may decode downlink control information (DCI) that schedules an NR PUSCH transmission, by the UE 102, in a particular slot. The UE 102 may determine an allocation for the NR PUSCH transmission to include one or more symbol periods of the data region of the particular slot based on the DCI. The UE 102 may determine the allocation for the NR PUSCH transmission to further include one or more symbol periods of the control region of the particular slot if the control indicator indicates that the NR PUSCH transmissions are permissible in the control regions in the slots.

In some embodiments, the control indicator may be received in a minimum system information (MSI), remaining minimum system information (RMSI), system information block (SIB) or radio resource control (RRC) signaling. It should be noted that embodiments are not limited to usage of RRC signaling, MSI(s), RMSI(s) and/or SIB(s) to communicate such information, as other signaling, messages, blocks and/or other elements may be used, in some embodiments. For instance, the control indicator may be included in another block, other signaling and/or other element. In a non-limiting example, a master information block (MIB) may be used in some embodiments.

In some embodiments, the UE 102 may determine the allocation for the NR PUSCH transmission to include one or more PRBs in the symbol periods of the allocation in the data region. The UE 102 may determine the allocation for the NR PUSCH transmission to further include one or more PRBs in the symbol periods of the allocation in the control region if the control indicator indicates that the NR PUSCH transmissions are permissible in the control regions in the slots. A channel for the NR PUSCH transmission may comprise multiple PRBs, in some embodiments.

In some embodiments, an apparatus of a UE 102 may comprise memory. The memory may be configurable to store at least a portion of the DCI. The memory may store one or more other elements and the apparatus may use them for performance of one or more operations. The apparatus may include processing circuitry, which may perform one or more operations (including but not limited to operation(s) of the method 500 and/or other methods described herein). The processing circuitry may include a baseband processor. The baseband circuitry and/or the processing circuitry may perform one or more operations described herein, including but not limited to decoding of the DCI and/or determination of the allocation. The apparatus of the UE 102 may include a transceiver to receive the DCI. The transceiver may transmit and/or receive other blocks, messages and/or other elements.

Figure 6:
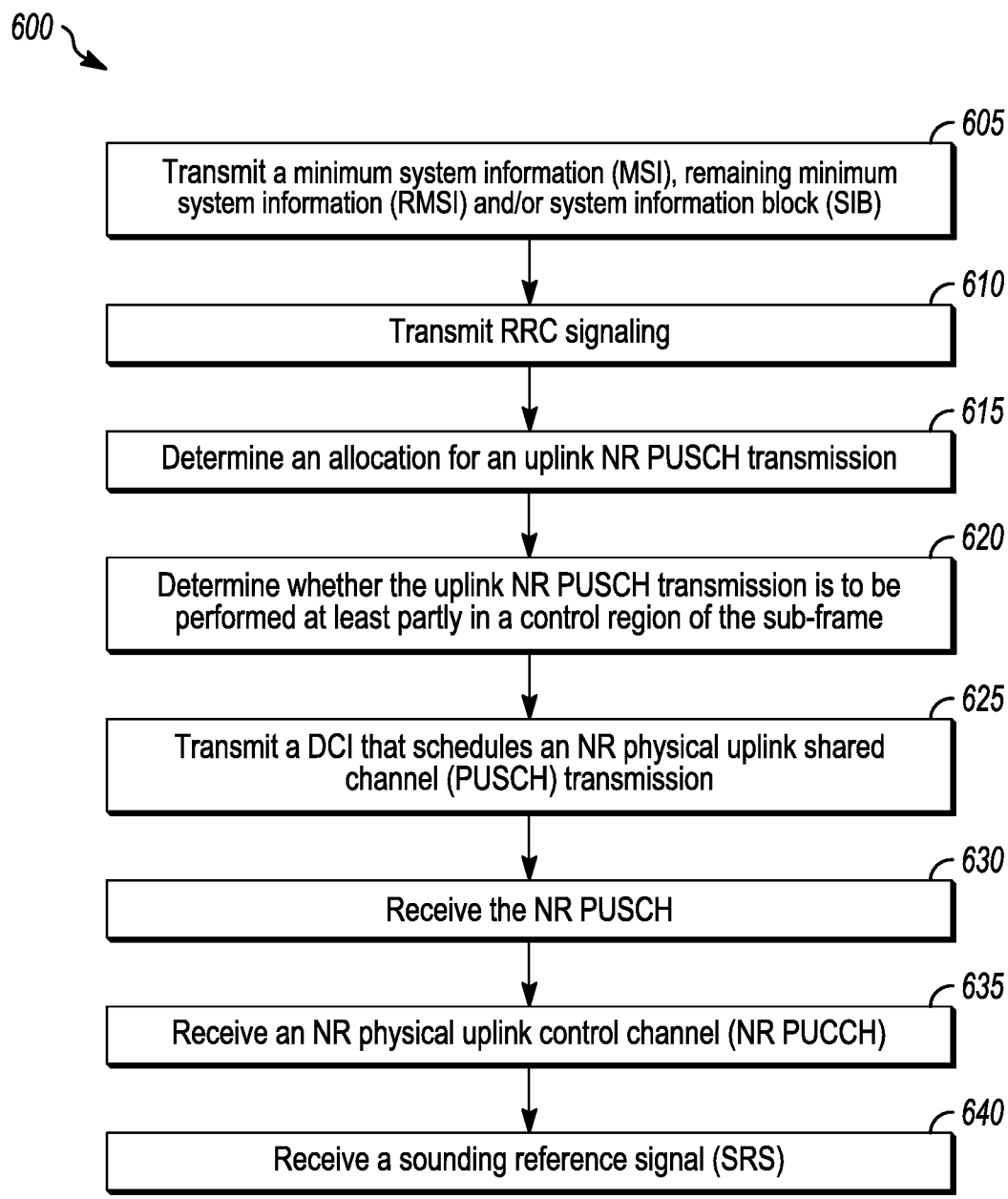
FIG. 6 illustrates the operation of another method of communication in accordance with some embodiments.

FIG. 6 illustrates the operation of another method of communication in accordance with some embodiments. As mentioned previously regarding the method 600, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-19, although it is understood that the method 600 may be practiced with any other suitable systems, interfaces and components. In addition, embodiments of the method 600 may be applicable to UEs 102, eNBs 104, gNBs 105, APs, STAs and/or other wireless or mobile devices. The method 600 may also be applicable to an apparatus of a UE 102, eNB 104, gNB 105 and/or other device described above.

It should be noted that references to an eNB 104 (such as in descriptions of the method 600 and/or other descriptions) are not limiting. In some embodiments, a gNB 105 may perform one or more operations of the method 600. In some embodiments, an eNB 104 configured to operate as a gNB 105 may perform one or more operations of the method 600.

In some embodiments, an eNB 104 may perform one or more operations of the method 600, but embodiments are not limited to performance of the method 600 and/or operations of it by the eNB 104. In some embodiments, the gNB 105 may perform one or more operations of the method 600 (and/or similar operations). In some embodiments, an eNB 104 may be configured to operate as a gNB 105 and may perform one or more operations of the method 600 (and/or similar operations). In some embodiments, the UE 102 may perform one or more operations of the method 600 (and/or similar operations). Accordingly, although references may be made to performance of one or more operations of the method 600 by the eNB 104 in descriptions herein, it is understood that the UE 102 may perform the same operation(s), similar operation(s) and/or reciprocal operation(s), in some embodiments.

It should be noted that the method 600 may be practiced by an eNB 104 and may include exchanging of elements, such as frames, signals, messages and/or other elements, with a UE 102. Similarly, the method 500 may be practiced by a UE 102 and may include exchanging of such elements with an eNB 104. In some cases, operations and techniques described as part of the method 500 may be relevant to the method 600. In addition, embodiments of the method 600 may include one or more operations performed by the eNB 104 that may be the same as, similar to or reciprocal to one or more operations described herein performed by the UE 102 (including but not limited to operations of the method 500). For instance, an operation of the method 500 may include reception of an element (such as a frame, block, message and/or other) by a UE 102 and the method 600 may include transmission of a same or similar element by the eNB 104.

In addition, previous discussion of various techniques and concepts may be applicable to the method 600 in some cases, including MSI, RMSI, SIB, RRC signaling, NR PUSCH, NR PUCCH, SRS, DCI, allocation of time resources (including but not limited to symbols, symbol periods, OFDM symbol periods and/or other), allocation of frequency resources (including but not limited to PRBs, RBs, REs, sub-channels, sub-carriers and/or other), technique(s) to determine an allocation and/or others. In addition, the examples shown in FIGS. 7-19 may also be applicable, in some cases, although the scope of embodiments is not limited in this respect.

At operation 605, the eNB 104 may transmit an MSI, RMSI and/or SIB. At operation 610, the eNB 104 may transmit RRC signaling. It should be noted that some embodiments may not necessarily include all operations shown in FIG. 6. In some embodiments, the eNB 104 may perform one of operations 605-610 but may not necessarily perform both operations 605-610. In some embodiments, the eNB 104 may perform both of operations 605-610.

At operation 615, the eNB 104 may determine an allocation for an NR PUSCH transmission in a slot. At operation 620, the eNB 104 may determine whether the uplink NR PUSCH transmission is to be performed at least partly in a control region of the slot. At operation 625, the eNB 104 may transmit a DCI that schedules the NR PUSCH transmission. The DCI may indicate the allocation in some embodiments. One or more of the previously described techniques may be used in operation 615, 620 and/or 625 in some embodiments, although the scope of embodiments is not limited in this respect. One or more techniques that may be similar to one or more of the previously described techniques may be used in operation 615, 620 and/or 625 in some embodiments, although the scope of embodiments is not limited in this respect. It should be noted that embodiments may not necessarily include all operations shown in FIG. 6. Accordingly, one or more of operation 615-620 may not necessarily be included in the method 600, in some embodiments.

At operation 630, the eNB 104 may receive the NR PUSCH transmission. At operation 635, the eNB 104 may receive one or more NR PUCCH transmissions. At operation 640, the eNB 104 may receive one or more SRS transmissions.

In some embodiments, the eNB 104 may transmit DCI that schedules an NR PUSCH transmission, by the UE 102, in a channel of multiple PRBs in a slot that comprises: a predetermined data region of one or more symbol periods, and a predetermined control region of one or more symbol periods reserved for NR PUCCH transmissions. The DCI may include an indicator of whether the NR PUSCH transmission is to be performed by the UE 102 at least partly in the control region. The eNB 104 may receive the NR PUSCH transmission from the UE 102 in an allocation that includes one or more of the PRBs in one or more of the symbol periods of the data region. The allocation may be configurable, based on the indicator of the DCI, to further include one or more of the PRBs in one or more of the symbol periods of the control region.

In some embodiments, the DCI may include a bitmap. Bit positions of the bitmap may be mapped to at least some of the PRBs in accordance with a predetermined mapping. Values of the bit positions of the bitmap may indicate whether corresponding PRBs are reserved for the NR PUCCH transmissions in the control region.

In some embodiments, the eNB 104 may determine, based on the DCI or RRC configuration or a combination thereof, a division of the PRBs in the one or more symbols of the control region to include: first PRBs for the NR PUCCH transmissions, and second PRBs for SRS transmissions. The eNB 104 may receive an SRS from the UE 102 in the control region in at least one of the second PRBs.

Figure 7:
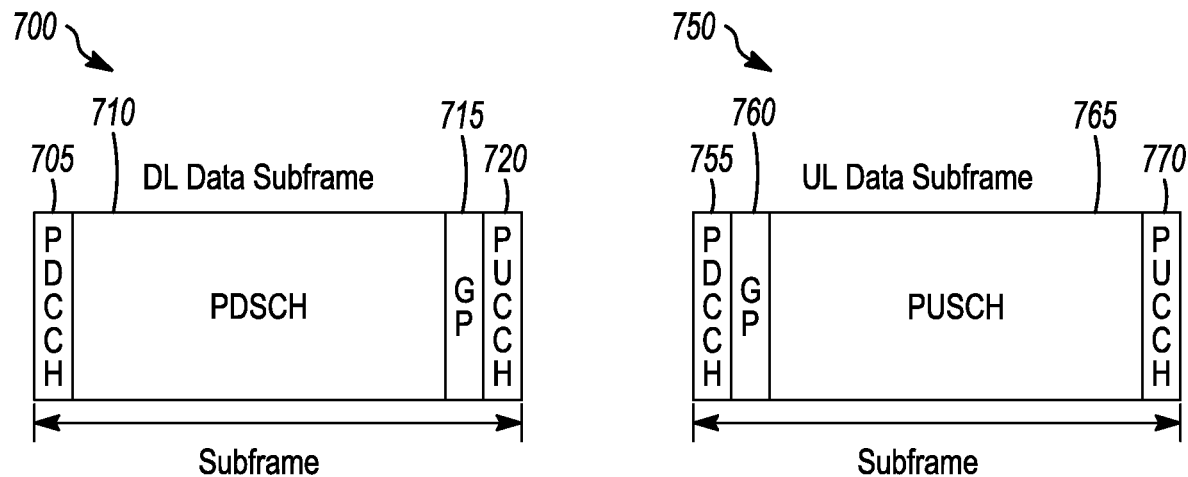
FIG. 7 illustrates example slots in accordance with some embodiments.
Figure 8:
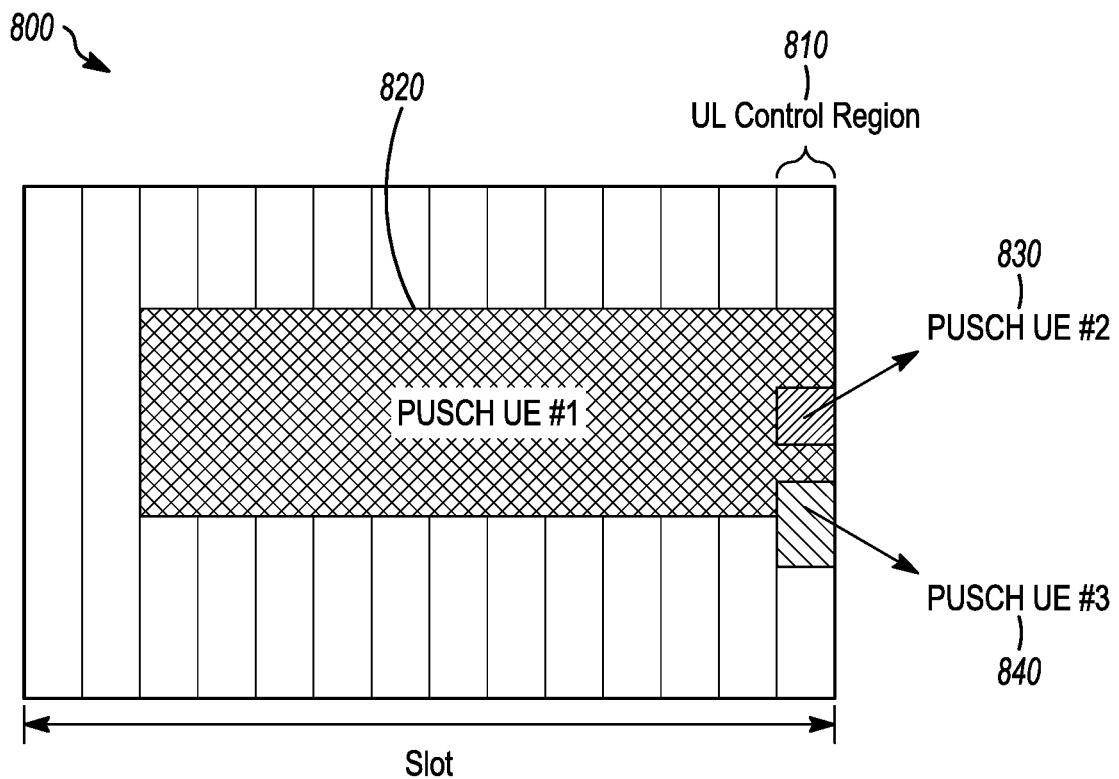
FIG. 8 illustrates an example of multiplexing of new radio (NR) physical uplink shared channel (NR PUSCH) and NR physical uplink control channel (NR PUCCH) in accordance with some embodiments.
Figure 9:
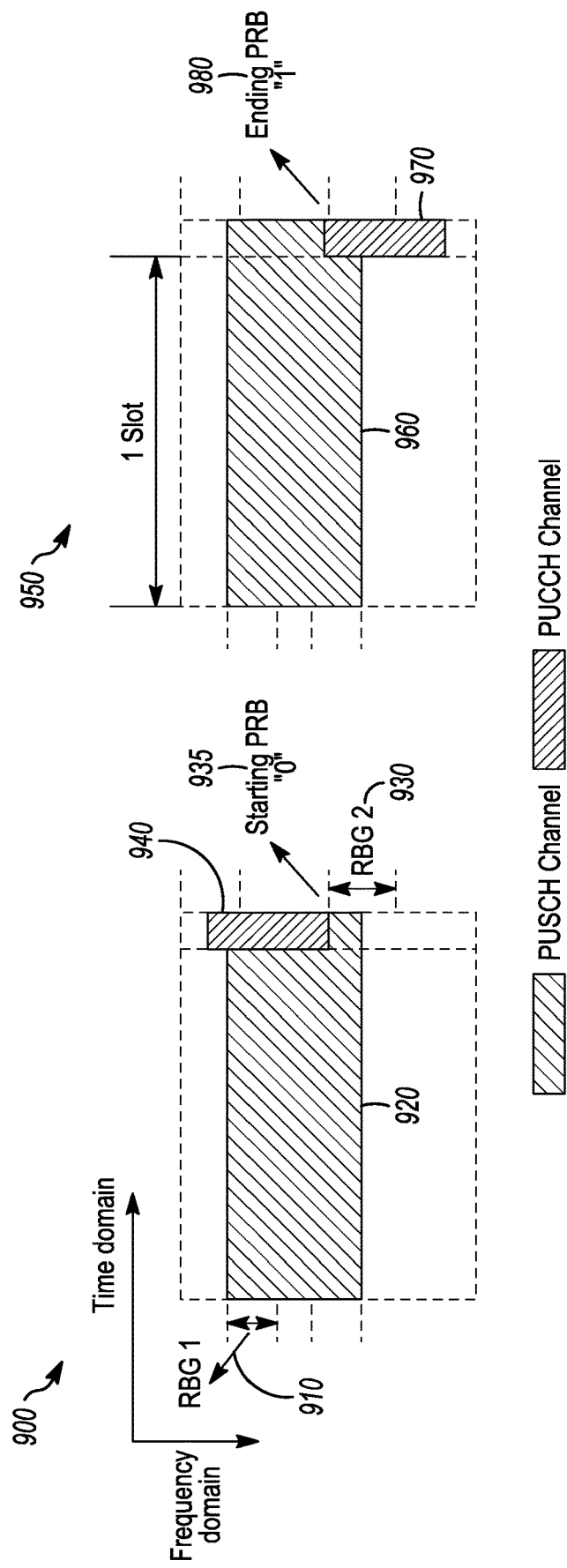
FIG. 9 illustrates another example of multiplexing of NR PUSCH and NR PUCCH in accordance with some embodiments.
Figure 10:
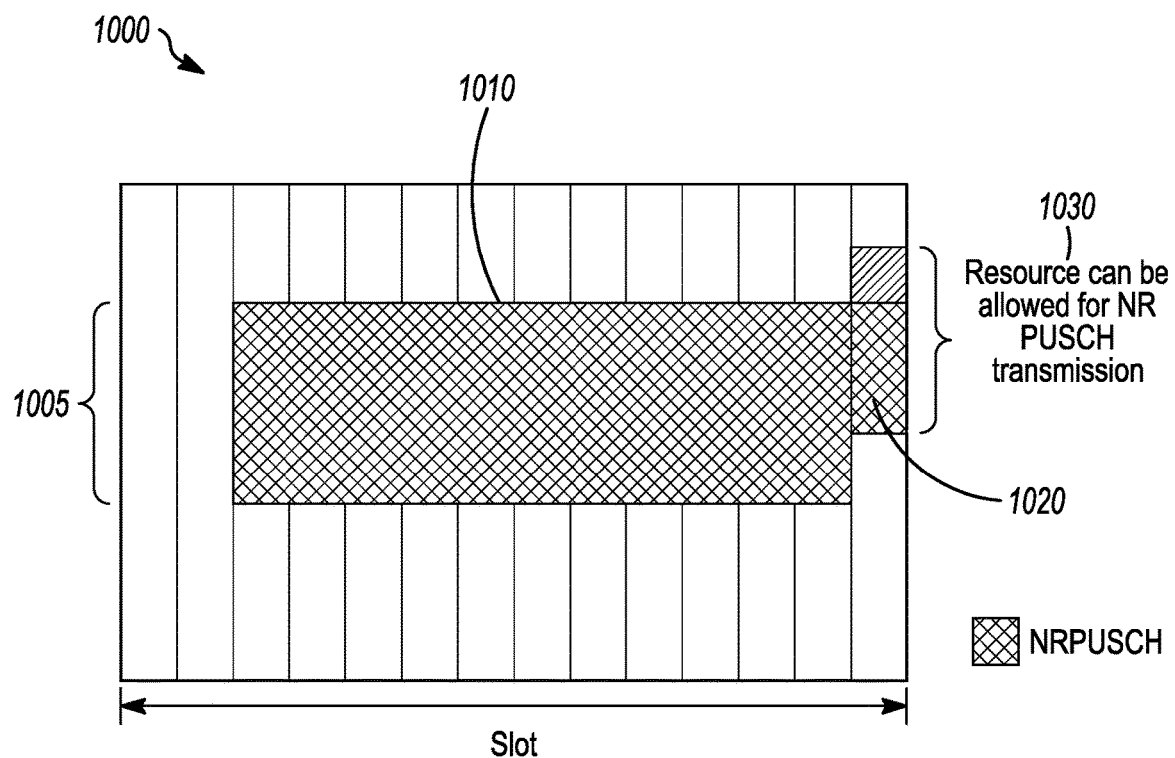
FIG. 10 illustrates another example of multiplexing of NR PUSCH and NR PUCCH in accordance with some embodiments.
Figure 11:
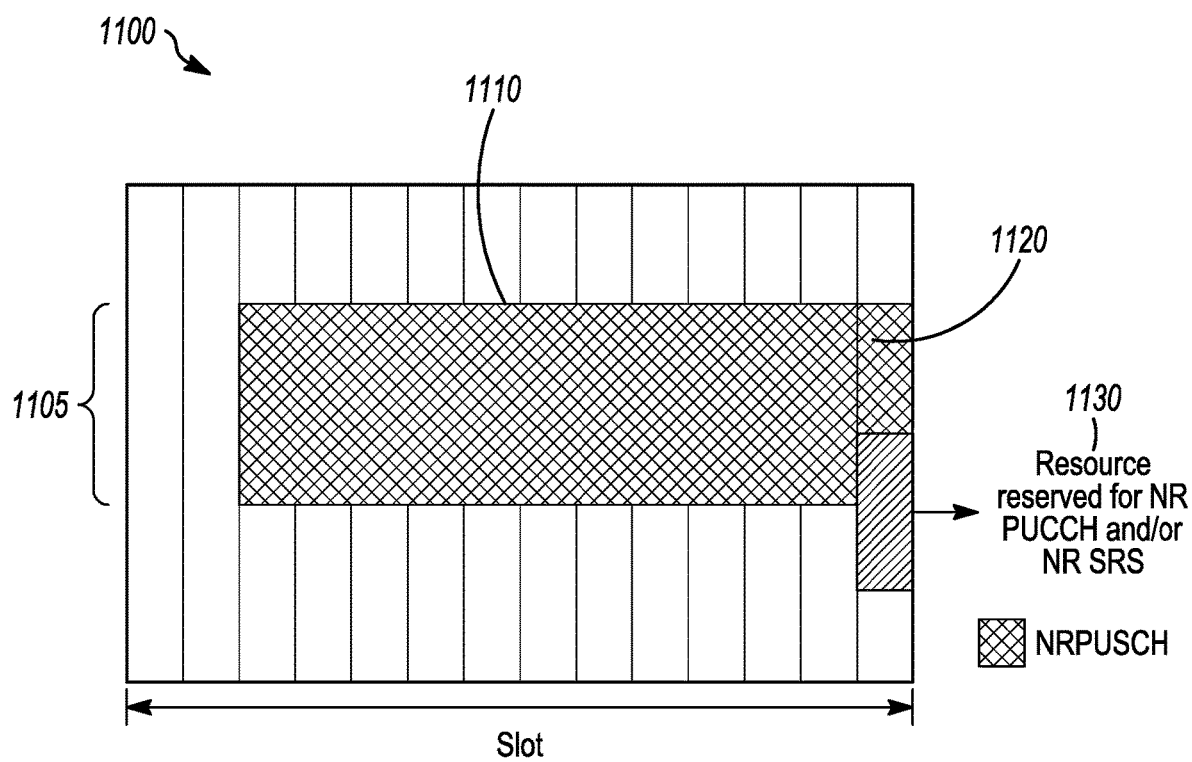
FIG. 11 illustrates another example of multiplexing of NR PUSCH and NR PUCCH in accordance with some embodiments.
Figure 12:
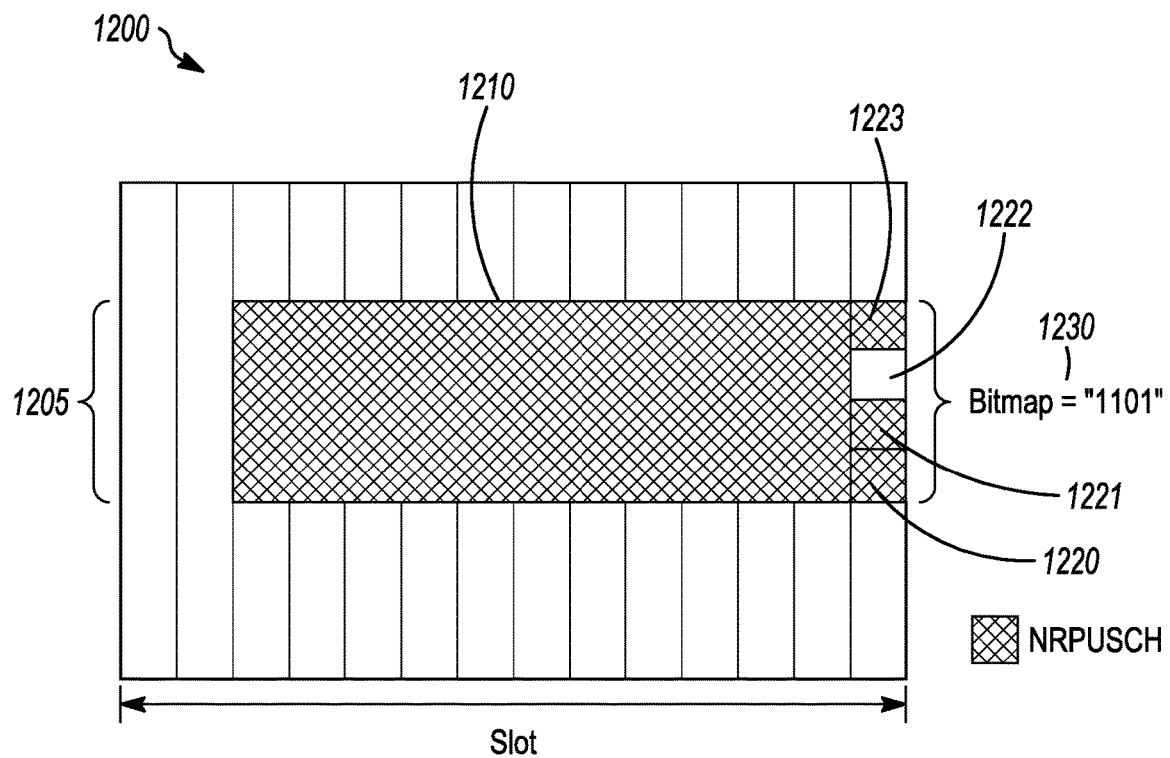
FIG. 12 illustrates another example of multiplexing of NR PUSCH and NR PUCCH in accordance with some embodiments.
Figure 13:
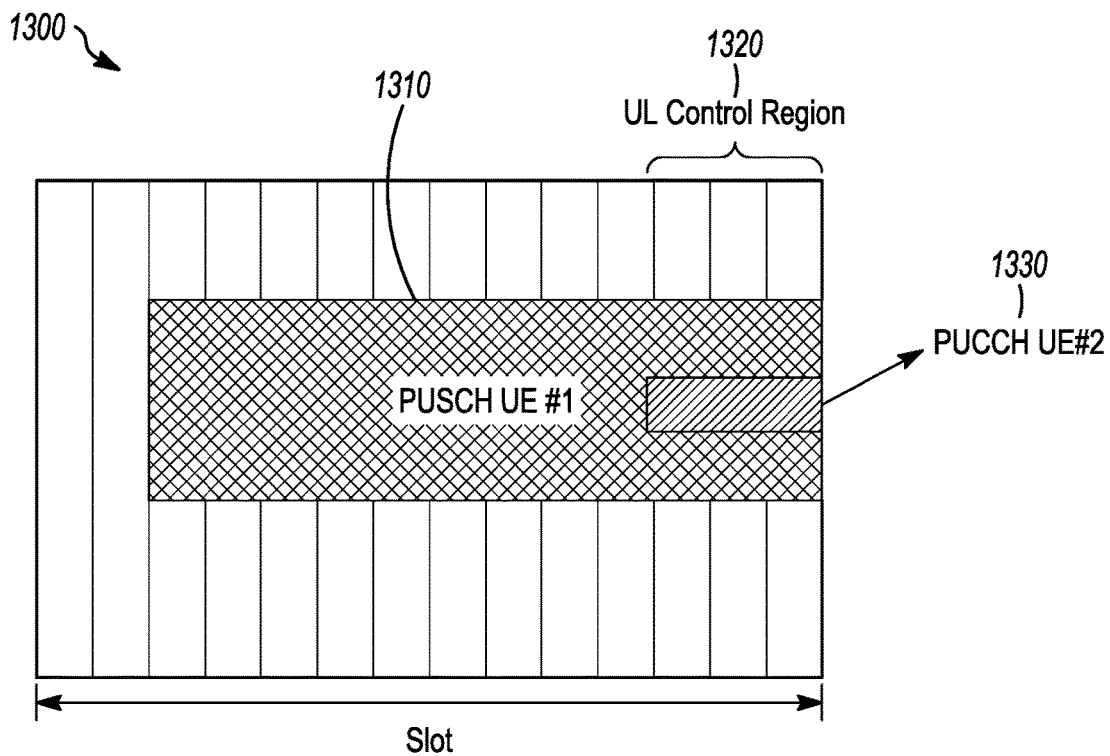
FIG. 13 illustrates another example of multiplexing of NR PUSCH and NR PUCCH in accordance with some embodiments.
Figure 14:
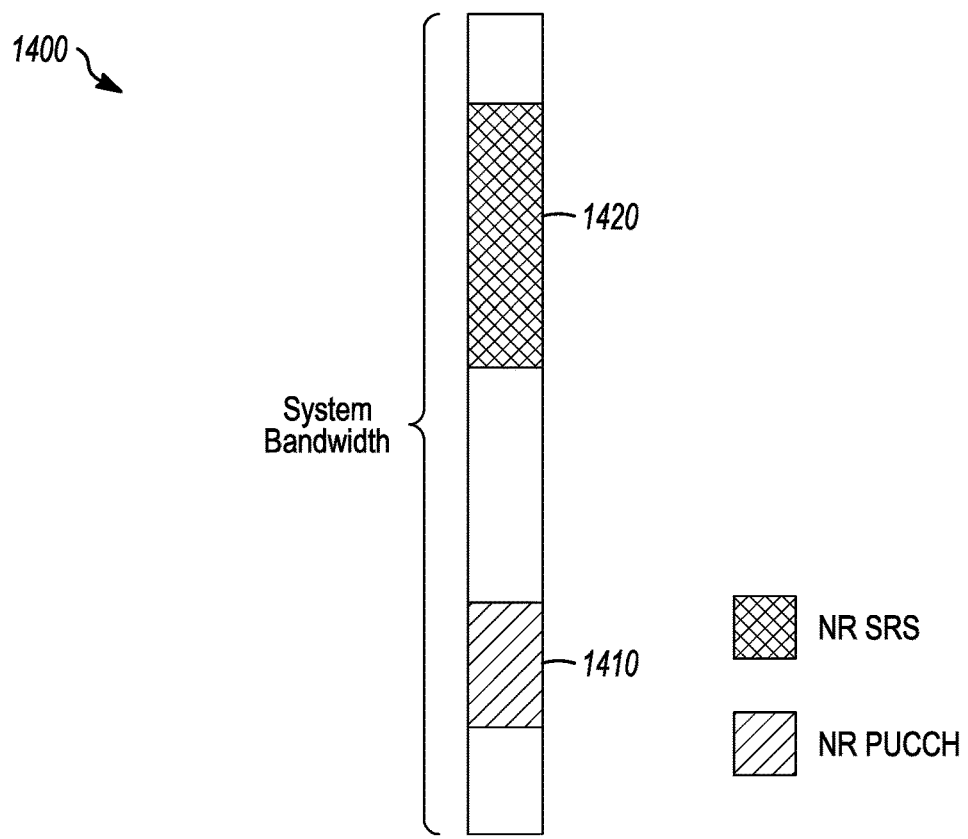
FIG. 14 illustrates an example of multiplexing of sounding reference signals (SRSs) and NR PUCCH in accordance with some embodiments.
Figure 15:
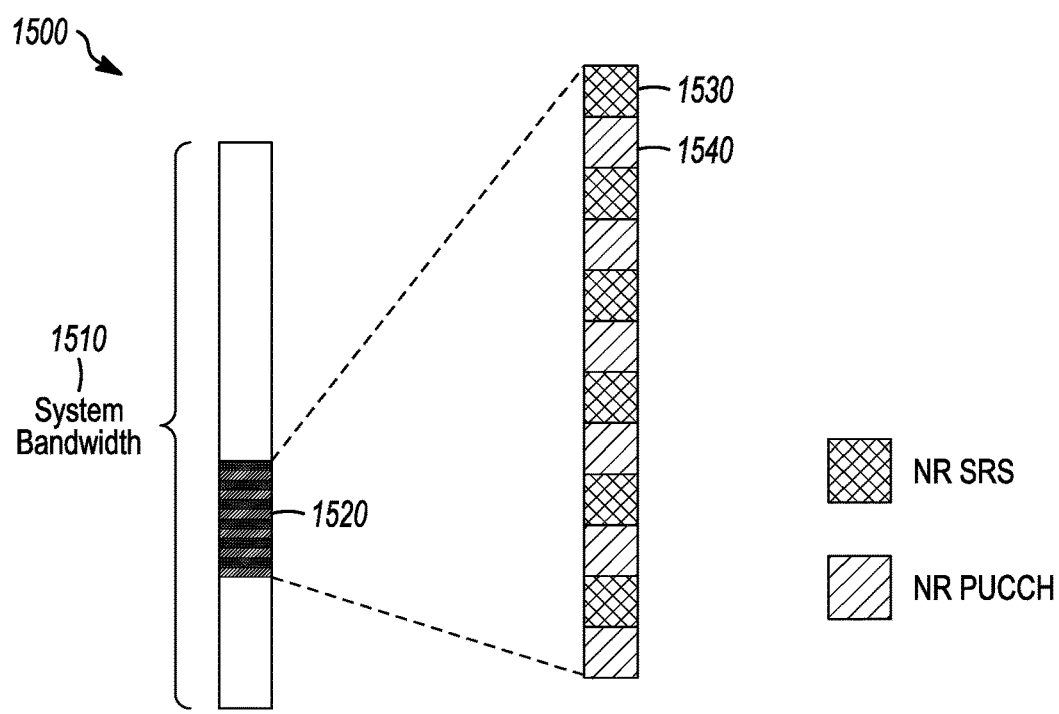
FIG. 15 illustrates another example of multiplexing of SRS and NR PUCCH in accordance with some embodiments.
Figure 16:
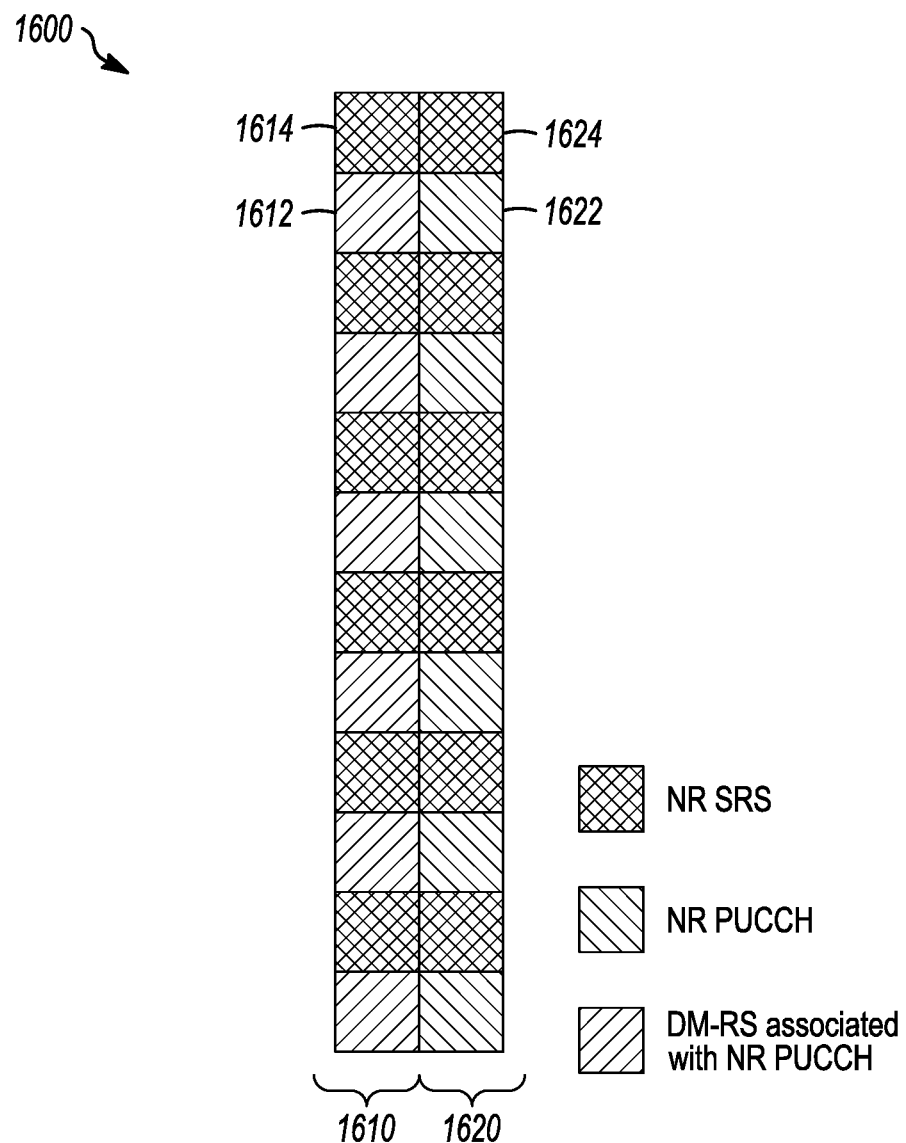
FIG. 16 illustrates another example of multiplexing of SRS and NR PUCCH in accordance with some embodiments.
Figure 17:
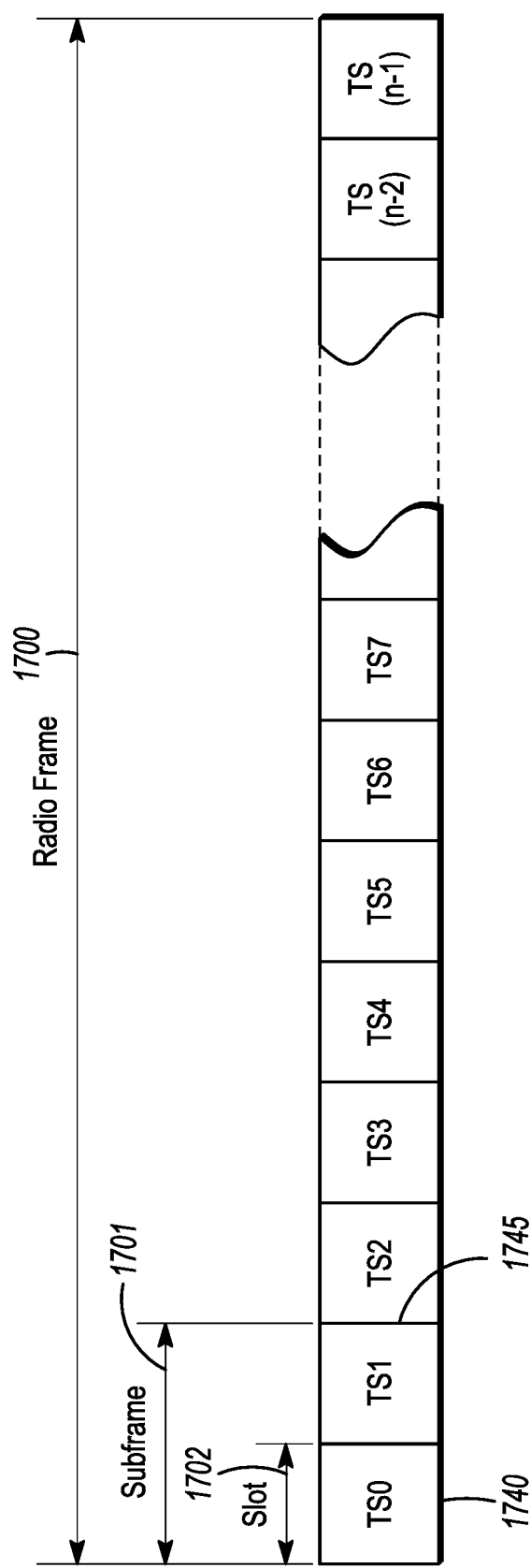
FIG. 17 illustrates an example radio frame structure in accordance with some embodiments.

FIG. 7 illustrates example slots in accordance with some embodiments. FIG. 8 illustrates an example of multiplexing of new radio (NR) physical uplink shared channel (NR PUSCH) and NR physical uplink control channel (NR PUCCH) in accordance with some embodiments. FIG. 9 illustrates another example of multiplexing of NR PUSCH and NR PUCCH in accordance with some embodiments. FIG. 10 illustrates another example of multiplexing of NR PUSCH and NR PUCCH in accordance with some embodiments. FIG. 11 illustrates another example of multiplexing of NR PUSCH and NR PUCCH in accordance with some embodiments. FIG. 12 illustrates another example of multiplexing of NR PUSCH and NR PUCCH in accordance with some embodiments. FIG. 13 illustrates another example of multiplexing of NR PUSCH and NR PUCCH in accordance with some embodiments. FIG. 14 illustrates an example of multiplexing of sounding reference signals (SRSs) and NR PUCCH in accordance with some embodiments. FIG. 15 illustrates another example of multiplexing of SRS and NR PUCCH in accordance with some embodiments. FIG. 16 illustrates another example of multiplexing of SRS and NR PUCCH in accordance with some embodiments. FIG. 17 illustrates an example of a radio frame structure in accordance with some embodiments. FIG. 18 illustrates example frequency resources in accordance with some embodiments. FIG. 19 illustrates an example of entities exchanging radio resource control (RRC) elements in accordance with some embodiments.

It should be noted that the examples shown in FIGS. 7-19 may illustrate some or all of the concepts and techniques described herein in some cases, but embodiments are not limited by the examples. For instance, embodiments are not limited by the name, number, type, size, ordering, arrangement and/or other aspects of the operations, time resources, symbol periods, frequency resources, PRBs, data regions, control regions, transmitted/received elements (such as NR PUSCH, NR PUCCH, SRS, DM-RS and/or other) and other elements as shown in FIGS. 7-19. Although some of the elements shown in the examples of FIGS. 7-19 may be included in a 3GPP LTE standard, 5G standard, NR standard and/or other standard, embodiments are not limited to usage of such elements that are included in standards.

In some scenarios, an NR protocol may enable higher data rates compared to other protocols, such as 3GPP LTE protocols, legacy protocols and/or other. In a non-limiting example, a NR protocol may be capable of a peak data rate of more than 10 Gps and a minimum guaranteed user data rate of at least 100 Mbps. To support the higher data rate for NR, a larger system bandwidth (in comparison to other systems, such as 3GPP LTE and other(s)) may be used. For instance, a carrier frequency above 6 GHz may be used, including but not limited to cmWave frequencies and/or mmWave frequencies. In some embodiments, multiple code blocks for one transport block may be transmitted in one slot.

In some embodiments, a TDD slot structure may be used, including but not limited to the example slots 700, 750 in FIG. 7. In some cases, these and other slot structures may enable low latency transmission for enhanced mobile broadband communication. These slot structures may be self-contained TDD slot structures, in some embodiments. These and other slot structures may be used in NR systems and/or other systems. In FIG. 7, the example self-contained TDD slot structures 700, 750 may comprise both downlink (DL) and uplink (UL) portions in one slot. It should be noted that in FIG. 7, guard periods (GPs) 715, 760 are used. In some cases, the GPs may be used at least partly to accommodate the DL to UL and UL to DL switching time and round-trip propagation delay. In the example slot 700, the GP 715 is inserted between NR physical downlink shared channel (NR PDSCH) 710 and NR physical uplink control channel (NR PUCCH) 720. In the example slot 750, the GP 760 is inserted between the NR physical downlink control channel (NR PDCCH) 755 and NR physical uplink shared channel (NR PUSCH) 765.

In some embodiments, including but not limited to embodiments that support a 3GPP LTE standard, an NR PUCCH may be transmitted in a frequency region on the edges of the system bandwidth. Further, the NR PUCCH and NR PUSCH may be multiplexed in a frequency division multiplexing (FDM) manner. However, in the examples 700, 750 in FIG. 7, the NR PUCCH and data channel are multiplexed in a time division multiplexing (TDM) manner.

In some embodiments, for a UL data slot, the NR PUCCH may occupy one or more physical resource blocks (PRBs) in the last symbol(s) within one slot. In order to improve the data rate for uplink transmission, it may be beneficial to allocate the NR PUSCH in the last symbol(s), in some embodiments. In this case, NR PUSCH and NR PUCCH may be multiplexed in the same symbol(s) in the last part of the slot.

In some embodiments, one or more of the following may be used: multiplexing of NR PUCCH and other physical channels and signals, resource allocation for NR PUSCH transmission in the UL control region, and/or multiplexing of NR PUCCH and NR sounding reference signal (SRS) in the same symbol.

In some embodiments, the NR PUCCH and NR PUSCH may be multiplexed in an FDM manner within UL control region within the same slot. The UL control region may span the last one or more symbols within one slot. In some cases, a data rate for uplink transmission may be improved as a result. As shown in the example of FIG. 8, in the last symbol 810 of the slot 800, NR PUSCH 820 for UE #1 may fully overlap with NR PUCCH 830 (for UE #2 in the example) and may partially overlap with NR PUCCH 840 (for UE #3 in the example). It should be noted that techniques, operations and/or methods described herein are not limited to multiplexing of NR PUSCH and NR PUCCH in the same UL control region. The same or similar techniques, operations and/or methods may be used for multiplexing of NR PUSCH and NR sounding reference signal (NR SRS) in the same symbol within one slot. It should also be noted that, although the NR PUSCH 820 starts from the third symbol as shown in the example 800, embodiments are not limited to this allocation, as any suitable allocation may be used. For instance, the NR PUSCH 820 may span the whole slot in some cases. The allocation may be based on a resource allocation in the UL grant, although the scope of embodiments is not limited in this respect.

In some embodiments, to enable NR PUSCH transmission in the UL control region within one slot, an indicator of one or more bits may be semi-statically configured by higher layers via one or more elements, including but not limited to an MSI, RMSI, SIB, radio resource control (RRC) signaling and/or other. In some embodiments, such information may be dynamically indicated in the downlink control information (DCI). For instance, a bit value of "1" may indicate that the NR PUSCH can be transmitted in the UL control region while a bit value of "0" may indicate that the NR PUSCH is not to be transmitted in the UL control region. Note that this indicator can be signaled in a UE specific or group/cell specific manner. Embodiments are not limited to the example assignment of "1" and "0" given above.

In some embodiments, when a UL grant indicates that an end symbol for an NR PUSCH is a last symbol within one slot, the UE 102 may assume that the NR PUSCH can be transmitted in the UL control region.

In some embodiments, the NR PUCCH and NR PUSCH may be multiplexed in an FDM manner in the UL control region. The resource(s) (such as PRBs and/or other) that can be used for NR PUSCH transmission in the UL control region within one slot may be semi-statically configured by higher layers via one or more elements, including but not limited to an MSI, RMSI, SIB, RRC signaling, dynamical indication in the downlink control information (DCI) and/or other. It should be noted that the resource(s) may include time resources and/or frequency resources. For instance, one or more symbols and a set of frequency resources may be included. In a non-limiting example, the last one or more symbols and a set of frequency resources may be included.

In some embodiments, a bitmap field in a DCI format may be used to indicate the resource block groups (RBGs) in the frequency domain in a given UL slot that are reserved for NR PUCCH transmission. In some embodiments, the bitmap field may indicate the resources that are dynamically shared for NR PUSCH transmission. In some embodiments, the minimum resource allocation unit (RAU) for NR PUSCH transmission in the NR PUSCH region and the NR PUCCH region may be different. For example, the RBG size for resource allocation in NR PUCCH region (for instance, RBG2 (930) in FIG. 9) may be larger than that in NR PUSCH region (for instance, RBG 1 (910) in FIG. 9). The RBG size in NR PUCCH region may at least depend on the minimum RAU for an NR PUCCH channel. In some embodiments, a bit may indicate the resource mapping (e.g. localized virtual resource blocks or distributed virtual resource blocks) of NR PUCCH, which may inform the UE 102 of NR PUSCH RE mapping operation.

In some embodiments, resource allocation assignment information for NR PUSCH transmission in the shared NR PUCCH region may indicate, to a scheduled UE 102, the starting or ending RBG that are reserved for NR PUCCH and/or scheduled for NR PUSCH transmission. Accordingly, the UE 102 may assume that a range from the lowest RB within the scheduled NR PUSCH region to the RBG indicated by the DCI format is used for NR PUCCH or NR PUSCH transmission. In some embodiments, one bit may indicate one of: starting PRB for the NR PUCCH transmission or ending PRB for the NR PUCCH transmission. The bit may be included in a DCI format in addition to the resource allocation field. An example of resource indication for NR PUSCH transmission in NR PUCCH region is shown in FIG. 9. The bit values of "0" and "1" are shown to indicate starting PRB 935 and ending PRB 980, respectively. Embodiments are not limited to this assignment of the values of "0" and "1."

In some embodiments, a combination of semi-static and dynamic signaling may be used to signal a resource allocation for the NR PUSCH in the UL control region within one slot. In a non-limiting example, a set of resources may be configured by higher layers via MSI, RMSI and/or RRC signaling, while one field in the UL grant may be used to indicate which resource from the set of resources can be used for NR PUSCH transmission in the UL control region within one slot.

In some embodiments, in the UL control region, the UE 102 may transmit the NR PUSCH in the overlapped region between allocated resource(s) indicated in the UL grant and the resource(s) which can be used for NR PUSCH transmission. In FIG. 10, an example of NR PUSCH resource allocation in the last one symbol within one slot is shown. In this example, the UE 102 may transmit the NR PUSCH 1010 within overlapped resource in the last symbol. For instance, if resource allocation for NR PUSCH transmission in the UL grant is from physical resource block (PRB) #50 through #80 (as indicated by 1005), while the resource(s) which can be allowed for NR PUSCH transmission in the last symbol is PRB #60 through #90 (as indicated by 1030), the UE 102 may transmit the NR PUSCH on PRB #60 through #80 (as indicated by 1020) for the last symbol and on PRB #50 through #80 (as indicated by 1005) for the other symbols. The technique described above may be applied to cases in which the UL control region occupies multiple symbols, in some embodiments. In a non-limiting example, the multiple symbols may include the last symbol. Embodiments are not limited by the example sizes (in terms of PRBs, symbols and/or other) of elements shown in FIG. 10 (such as ranges, regions and/or other).

In some embodiments, the resource(s) reserved for NR PUCCH or SRS for one or more UEs 102 may be semi-statically configured from higher layers via MSI, RMSI, SIB, RRC signaling and/or other. In cases when the NR PUSCH is transmitted within the UL control region, the UE 102 may determine available resource(s) for NR PUSCH transmission. In a non-limiting example, the available resources may be a non-overlapping region between allocated resource(s) in the UL grant and reserved resource(s).

FIG. 11 illustrates an example of resource allocation for NR PUSCH. In this example, resource allocation for NR PUSCH transmission in the UL grant is in a range indicated by 1105 (such as from physical resource block (PRB) #50 through #80), and reserved resource(s) for NR PUCCH are in a range indicated by 1130 (such as from PRB #40 through #60). The UE 102 may transmit NR PUSCH in the range indicated by 1120 (such as from PRB #60 through #80) for the last symbol and on PRB #50 through #80 (as indicated by 1110) for the other symbols. The technique described above may be used in cases in which the UL control region occupies multiple symbols including the last symbol. Embodiments are not limited by the example sizes (in terms of PRBs, symbols and/or other) of elements shown in FIG. 11 (such as ranges, regions and/or other).

In some embodiments, the UE 102 may use one or more techniques in the UL control region, such as rate matching, puncturing around the reserved resources for other uplink physical channels and signals and/or other technique(s).

In some embodiments, resource(s) allocated for NR PUSCH transmission in the UL control region may be explicitly signaled, such as in the DCI for UL grant and/or other element. For instance, a bitmap may indicate which part of resource(s) within a scheduled transmission bandwidth and/or system bandwidth may be used for NR PUSCH transmission.

FIG. 12 illustrates an example of NR PUSCH resource allocation in UL control region using a bitmap. In the example 1200, a bitmap value of "1101" (as indicated by 1230) is signaled in the DCI. Assuming scheduled NR PUSCH transmission bandwidth in a first range of PRB #40 to #47 (as indicated by 1205) and minimum resource granularity as 2 PRBs, then the UE 102 may transmit NR PUSCH in a second range that includes PRB #40-43 and PRB #46-47 in the last symbol within one slot. Accordingly, the first range 1205 includes four groups of 2 PRBs (1220-1223) mapped to the four bits of the bitmap. For the bitmap value of 1101, the groups 1220, 1221, and 1223 are included in the second range while the group 1222 is not included in the second range. Embodiments are not limited by the example sizes (in terms of PRBs, symbols, bits and/or other) of elements shown in FIG. 12 (such as ranges, regions, bitmaps and/or other). Embodiments are also not limited to the example mapping of bitmap positions to PRB(s).

In some embodiments, the bitmap size may be fixed. Depending on scheduled NR PUSCH transmission bandwidth, the PRB resource granularity for each bit in the bitmap may vary accordingly. In a non-limiting example, when the scheduled bandwidth is doubled, the number of PRBs indicated by each bit in the bitmap may be doubled and the fixed size bitmap may cover the increased bandwidth.

In some embodiments, a fixed resource granularity may be defined for each bit in the bitmap. Depending on the scheduled transmission bandwidth for NR PUSCH, the bitmap size may vary. It should be noted that in cases when a two stage DCI is used for scheduling NR PUSCH transmission, the scheduled NR PUSCH transmission bandwidth may be indicated in the first stage DCI and a size of the bitmap included in the second stage DCI may be determined. The bitmap may indicate PRBs to be used for NR PUSCH transmission in the UL control region. In this case, after successful decoding of first stage DCI, the UE 102 may determine the exact bitmap size and corresponding DCI size for the second stage DCI. In some cases, a number of blind decoding attempts may be reduced as a result.

In some embodiments, a start PRB index, an end PRB index and/or symbol index for NR PUSCH transmission in UL control region may be configured by higher layers or explicitly indicated in the DCI or a combination thereof. Depending on the scheduled NR PUSCH transmission bandwidth, the UE 102 may determine the corresponding resource(s) for NR PUSCH transmission in the UL region. In a non-limiting example, resource allocation for NR PUSCH transmission indicated in the UL grant may be in a first range (such as from PRB #50 through #80). A start PRB usable for NR PUSCH transmission in the UL control region may be indicated (such as #60 in this example). The UE 102 may determine a second range based on the above (such as PRB #60 through #80 in this example). The UE 102 may transmit the NR PUSCH in the second range of PRBs (such as #60 through #80 in this example) during the last symbol and may transmit the NR PUSCH in the first range of PRBs (such as PRBs #50 through #80 in this example) during the other symbols. It should be noted that the technique described above may be used in cases in which the UL control region spans more than one symbol. As shown in the example of FIG. 11, the NR PUSCH 1310 may be rate matched or punctured around the reserved resources for other physical channel and signals. The reserved resources may include both time (symbol index) and frequency domain resource (for instance, PRB or RBG index). Embodiments are not limited by the example sizes (in terms of PRBs, symbols and/or other) of elements shown in FIG. 13 (such as ranges, regions and/or other).

In some embodiments, an NR PUCCH and SRS may be multiplexed in a frequency division multiplexing (FDM) manner in the same symbol within one slot. In a non-limiting example, separate frequency resource may be allocated for NR PUCCH and SRS transmission. As shown in the example in FIG. 14, the resources allocated for NR PUCCH and SRS (1410 and 1420, respectively) are separate in the frequency domain within the same symbol. Embodiments are not limited by the example sizes (in terms of PRBs, symbols and/or other) of elements shown in FIG. 14 (such as ranges, regions and/or other).

In some embodiments, resources allocated for NR PUCCH and SRS transmission may be interleaved. In a non-limiting example, this technique may be used in cases in which the NR SRS transmission may occupy a full system bandwidth for link adaption and scheduling, and the technique may be used to avoid frequency segmentation for NR SRS transmission. The scope of embodiments is not limited to such cases, however. In some embodiments, interleaved frequency division multiple access (IFDMA) with a repetition factor (such as "M") may be employed for NR PUCCH and SRS transmission. In a non-limiting example, the repetition factor may be predefined in a specification, (such as M=2, 4 or other suitable value). In another non-limiting example, the repetition factor may be configured by higher layers (such as via MSI, RMSI, SIB, RRC signaling and/or other).

In some embodiments, for multiplexing of the NR PUCCH and SRS in the same symbol within one slot, different comb offsets may be assigned for NR PUCCH and SRS. It should be noted that comb offset(s) for NR PUCCH and SRS transmission may be semi-statically configured by higher layers (such as via MSI, RMSI, SIB and/or RRC signaling) and/or may be dynamically indicated in the DCI. A combination of such techniques may be used, in some embodiments. In a non-limiting example, in case IFDMA with M=2 is employed for both NR PUCCH and SRS, a first comb offset of 0 may be used for NR PUCCH and a second comb offset of 1 may be used for SRS.

FIG. 15 illustrates an example of interleaved resource allocation for NR PUCCH and NR SRS. The region 1520 of the system bandwidth 1510 is used for NR PUCCH transmission. As indicated by 1530, one or more PRBs may be used for SRS transmission. As indicated by 1540, one or more PRBs may be used for PUCCH transmission and/or DM-RS transmission. Interleaving of frequency resources for the NR PUCCH and SRS transmissions is used. In this example, IFDMA with M=2 is employed for both NR PUCCH and NR SRS. It should be noted that the transmission bandwidth assigned for NR PUCCH and SRS may be different, in some cases. In a non-limiting example, those bandwidths may depend on configuration and NR PUCCH formats. Embodiments are not limited by the example sizes (in terms of PRBs, symbols and/or other) of elements shown in FIG. 15 (such as ranges, regions and/or other).

The above technique may be extended to cases in which more than one symbol is allocated for NR PUCCH. In a non-limiting example, when two symbols are used for NR PUCCH transmission, the first symbol may be used for DM-RS and for NR PUCCH. The second symbol may be used for NR PUCCH transmission. In this case, both NR PUCCH and associated DM-RS may follow an IDFMA structure. The NR SRS may be transmitted in both symbols and multiplexed with NR PUCCH and DM-RS in an interleaved fashion. FIG. 16 illustrates an example of interleaved resources for NR PUCCH/DM-RS and NR SRS when two symbols (1610 and 1620) are allocated for NR PUCCH. Embodiments are not limited by the example sizes (in terms of PRBs, symbols and/or other) of elements shown in FIG. 16 (such as ranges, regions and/or other).

An example of a radio frame structure that may be used in some aspects is shown in FIG. 17. In this example, radio frame 1700 has a duration of 10 ms. Radio frame 1700 is divided into slots 1702 each of duration 0.5 ms, and numbered from 0 to 19. Additionally, each pair of adjacent slots 1702 numbered 2i and 2i+1, where i is an integer, is referred to as a subframe 1701.

In some aspects using the radio frame format of FIG. 17, each subframe 1701 may include a combination of one or more of downlink control information, downlink data information, uplink control information and uplink data information. The combination of information types and direction may be selected independently for each subframe 1702.

In some aspects, a sub-component of a transmitted signal consisting of one subcarrier in the frequency domain and one symbol interval in the time domain may be termed a resource element. Resource elements may be depicted in a grid form as shown in FIG. 18A and FIG. 18B.

Figure 18A:
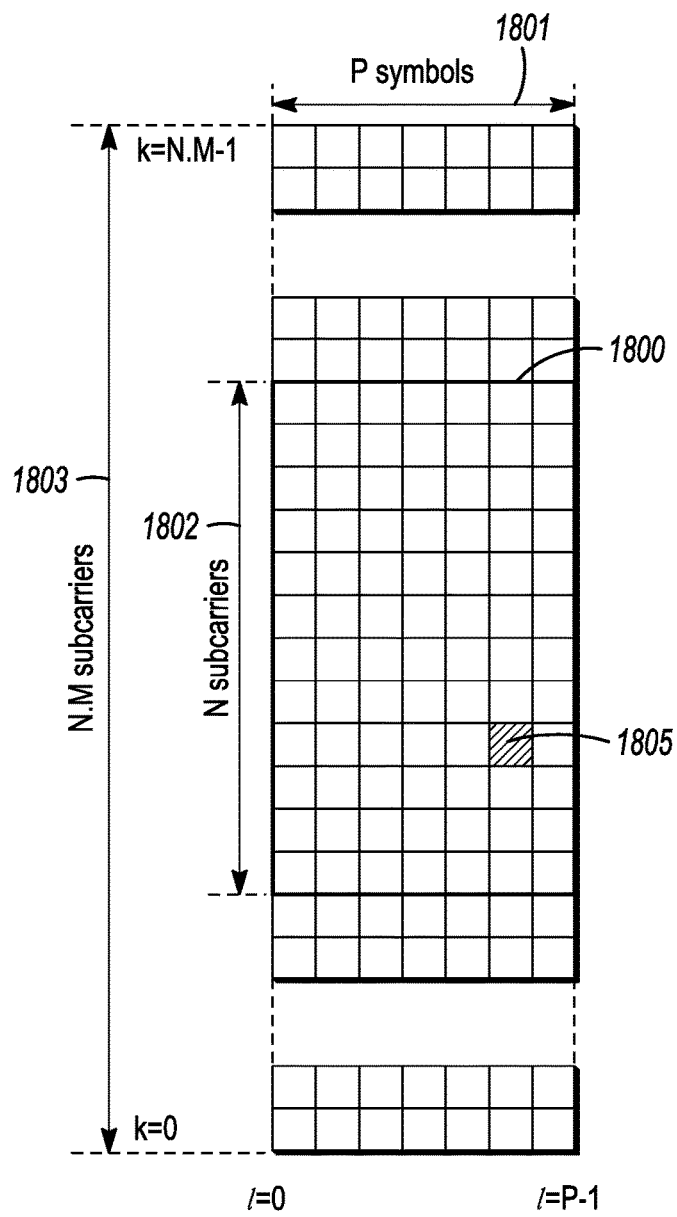
FIGS. 18A-B illustrates example frequency resources in accordance with some embodiments.
Figure 19:
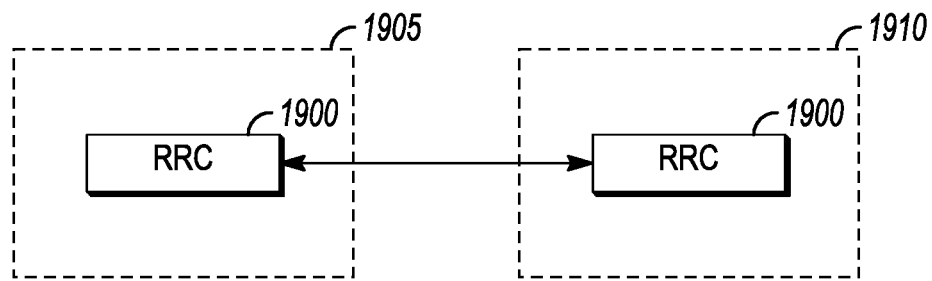
FIG. 19 illustrates an example of entities exchanging radio resource control (RRC) elements in accordance with some embodiments.

In some aspects, illustrated in FIG. 18A, resource elements may be grouped into rectangular resource blocks 1800 consisting of 12 subcarriers in the frequency domain and the P symbols in the time domain, where P may correspond to the number of symbols contained in one slot, and may be 6, 7, or any other suitable number of symbols.

Figure 18B:
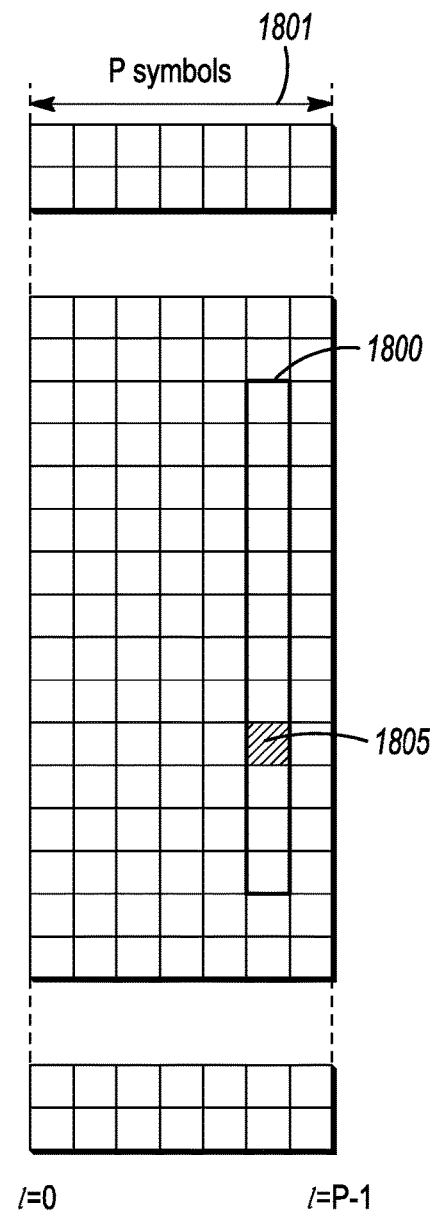

In some alternative aspects, illustrated in FIG. 18B, resource elements may be grouped into resource blocks 1800 consisting of 12 subcarriers (as indicated by 1802) in the frequency domain and one symbol in the time domain. In the depictions of FIG. 18A and FIG. 18B, each resource element 1805 may be indexed as (k, l) where k is the index number of subcarrier, in the range 0 to N·M−1 (as indicated by 1803), where N is the number of subcarriers in a resource block, and M is the number of resource blocks spanning a component carrier in the frequency domain Aspects of communication between instances of radio resource control (RRC) layer 1900 are illustrated in FIG. 19. According to an aspect, an instance of RRC 1900 contained in a user equipment (UE) 1905 may encode and decode messages, transmitted to and received from respectively, a peer RRC instance 1900 contained in a base station 1910 which may be an evolved node B (eNodeB), gNodeB or other base station instance.

According to an aspect, an RRC 1900 instance may encode or decode broadcast messages, which may include one or more of system information, cell selection and reselection parameters, neighboring cell information, common channel configuration parameters, and other broadcast management information.

According to an aspect, an RRC 1900 instance may encode or decode RRC connection control messages, which may include one or more of paging information, messages to establish, modify, suspend, resume or release RRC connection, messages to assign or modify UE identity, which may include a cell radio network temporary identifier (C-RNTI), messages to establish, modify or release a signaling radio bearer (SRB), data radio bearer (DRB) or QoS flow, messages to establish, modify or release security associations including integrity protection and ciphering information, messages to control inter-frequency, intra-frequency and inter-radio access technology (RAT) handover, messages to recover from radio link failure, messages to configure and report measurement information, and other management control and information function.

In some embodiments, a system and method of wireless communication for a fifth generation (5G) or new radio (NR) system may be used. The gNG 105 may configure resource(s) for NR PUSCH transmission in an uplink (UL) control region. The uplink control region may span the last one or more symbols within a slot. The UE 102 may transmit NR PUSCH according to the configured resource within the slot. In some embodiments, an indicator (of one or more bits) to enable NR PUSCH transmission in UL control region within one slot may be semi-statically configured by higher layers via minimum system information (MSI), remaining minimum system information (RMSI), system information block (SIB), radio resource control (RRC) signaling and/or other. Dynamic indication in the downlink control information (DCI) may be used in some embodiments. In some embodiments, when the UL grant indicates that an end symbol for NR PUSCH is a last symbol within the slot, the UE 102 may assume that the NR PUSCH can be transmitted in the UL control region. In some embodiments, the resource(s) that can be used for NR PUSCH transmission in the UL control region within the slot may be semi-statically configured by higher layers via MSI, RMSI, SIB, radio resource control (RRC) signaling and/or other. Dynamical indication in the downlink control information (DCI) may be used in some embodiments. In some embodiments, a combination of semi-static or dynamic signaling may be used to signal the resource(s) allocated for the NR PUSCH in the UL control region within the slot. A set of resources may be configured by higher layers via MSI, RMSI, SIB, RRC signaling and/or other. A field in the UL grant may be used to indicate which resource(s) from the set of resources can be used for NR PUSCH transmission in the UL control region within the slot. In some embodiments, in the UL control region, the UE 102 may transmit the NR PUSCH in an overlapped region between allocated resource indicated in the UL grant and the resource which can be allowed for NR PUSCH transmission.

In some embodiments, the resource(s) reserved for NR physical uplink control channel (NR PUCCH) or SRS for one or more UEs 102 may be semi-statically configured from higher layers via MSI, RMSI, SIB, RRC signaling and/or other. The UE 102 may determine the available resource(s) for NR PUSCH transmission. In a non-limiting example, the available resources may be a non-overlapping region between allocated resource(s) in the UL grant and reserved resource(s).

In some embodiments, the NR PUSCH may be rate matched or punctured around the reserved resource(s) for other uplink physical channels and signals. In some embodiments, the resource(s) allocated for NR PUSCH transmission in the UL control region may be signaled (explicitly or otherwise) in the DCI for UL grant. A bitmap field in a DCI format may be used to indicate the resource block groups in the frequency domain in a given UL slot reserved for NR PUCCH transmission or may alternatively indicate the resources that are dynamically shared for NR PUSCH transmission. In some embodiments, the minimum resource allocation unit (RAU) for NR PUSCH transmission in NR PUSCH region and the NR PUCCH region may be different. An indicator (of one or more bits) may indicate the resource mapping. For instance, localized virtual resource blocks or distributed virtual resource blocks of the NR PUCCH may be used. In some cases, those blocks may enable the UE 102 for an NR PUSCH RE mapping operation.

In some embodiments, the resource allocation assignment information for NR PUSCH transmission in the shared NR PUCCH region may indicate (such as to a scheduled UE 102 and/or other UE 102) the starting RBG and/or ending RBG that are reserved for NR PUCCH or scheduled for NR PUSCH transmission. In some embodiments, when a two stage DCI is used for scheduling NR PUSCH transmission, a scheduled NR PUSCH transmission bandwidth may be indicated in the first stage DCI. A bitmap for NR PUSCH resource allocation in UL control region may be explicitly signaled in the second stage DCI. In some embodiments, a start PRB index, an end PRB index and/or symbol index for NR PUSCH transmission in UL control region may be configured by higher layers and/or explicitly indicated in the DCI. The UE 102 may determine the corresponding resource(s) for NR PUSCH transmission in the UL region.

In some embodiments, an NR PUCCH and sounding reference signal (SRS) may be multiplexed in a frequency division multiplexing (FDM) manner in the same symbol within one slot. In some embodiments, separate frequency resource(s) may be allocated for NR PUCCH and SRS transmission. In some embodiments, resource(s) allocated for NR PUCCH and SRS transmission may be interleaved. Interleaved frequency division multiple access (IFDMA) with repetition factor (such as "M") may be employed for NR PUCCH and SRS transmission. The repetition factor may be predefined in a specification in some embodiments. For instance, a value such as 2, 4 or other may be used. The repetition factor may be configured by higher layers, in some embodiments, via MSI, RMSI, SIB and/or RRC signaling. In some embodiments, different comb offsets may be assigned for NR PUCCH and SRS. In a non-limiting example, the comb offset(s) for NR PUCCH and SRS transmission may be semi-statically configured by higher layer via MSI, RMSI, SIB, RRC signaling and/or other. In another non-limiting example, dynamic indication of comb offset(s) in the DCI may be used. In another non-limiting example, a combination of semi-static configuration and dynamic indication may be used.

In Example 1, an apparatus of a User Equipment (UE) may comprise memory. The apparatus may further comprise processing circuitry. The processing circuitry may be configured to decode downlink control information (DCI) that indicates an allocation for a new radio (NR) physical uplink shared channel (NR PUSCH) transmission, by the UE, in a channel of multiple physical resource blocks (PRBs) in a slot that comprises: a predetermined data region of one or more symbol periods, and a predetermined control region of one or more symbol periods reserved for NR physical uplink control channel (NR PUCCH) transmissions. The DCI may be configurable to indicate whether the allocation includes one or more of the PRBs in the control region. The processing circuitry may be further configured to store at least a portion of the DCI in the memory. The processing circuitry may be further configured to determine the allocation based on the DCI. The allocation may include one or more of the PRBs in one or more of the symbol periods of the data region. The allocation may be configurable to include one or more of the PRBs in one or more of the symbol periods of the control region.

In Example 2, the subject matter of Example 1, wherein for the allocation, the PRBs included in the data region are first PRBs and the PRBs included in the control region are second PRBs. The allocation may be configurable for first PRBs and second PRBs that are the same.

In Example 3, the subject matter of one or any combination of Examples 1-2, wherein for the allocation, the PRBs included in the data region are first PRBs and the PRBs included in the control region are second PRBs. The allocation may be configurable for first PRBs and second PRBs that are different.

In Example 4, the subject matter of one or any combination of Examples 1-3, wherein the DCI may include a bitmap for which bit positions are mapped to at least some of the PRBs in accordance with a predetermined mapping. Values of the bit positions of the bitmap may indicate whether corresponding PRBs are reserved for the NR PUCCH transmissions in the control region.

In Example 5, the subject matter of one or any combination of Examples 1-4, wherein the DCI may include a start PRB or an end PRB. The processing circuitry may be further configured to determine, based at least partly on the start PRB or the end PRB, the one or more PRBs in the control region for the allocation.

In Example 6, the subject matter of one or any combination of Examples 1-5, wherein the DCI may indicate a range of PRBs for which NR PUSCH transmissions are permissible in the control region. For the allocation, the PRBs included in the data region are first PRBs. The processing circuitry may be further configured to determine, for the allocation, second PRBs for the control region based at least partly on an intersection between the first PRBs and the range of PRBs indicated in the DCI.

In Example 7, the subject matter of one or any combination of Examples 1-6, wherein the DCI may include an end symbol for the allocation for the NR PUSCH transmission. The processing circuitry may be further configured to determine that the NR PUSCH transmission is to be performed at least partly in the control region if the end symbol for the allocation is included in the control region.

In Example 8, the subject matter of one or any combination of Examples 1-7, wherein the processing circuitry further configured to determine, based on the DCI, the allocation for the NR PUSCH transmission to include: contiguous first PRBs in contiguous symbol periods of the data region; and, if the indicator of the DCI indicates that the NR PUSCH transmission is to be performed at least partly in the control region, contiguous second PRBs in one or more contiguous symbol periods of the control region.

In Example 9, the subject matter of one or any combination of Examples 1-8, wherein the DCI may include a bitmap for which bit positions are mapped to at least some of the PRBs in accordance with a predetermined mapping. Values of the bit positions of the bitmap may indicate whether corresponding PRBs are to be included in the allocation in the control region.

In Example 10, the subject matter of one or any combination of Examples 1-9, wherein the processing circuitry may be further configured to determine, based on the DCI, a division of the PRBs in the one or more symbols of the control region to include: first PRBs for the NR PUCCH transmissions, and second PRBs for sounding reference signal (SRS) transmissions. The processing circuitry may be further configured to encode an SRS for transmission in the control region in at least one of the second PRBs.

In Example 11, the subject matter of one or any combination of Examples 1-10, wherein the processing circuitry may be further configured to encode data bits to generate the NR PUSCH transmission in accordance with the allocation.

In Example 12, the subject matter of one or any combination of Examples 1-11, wherein the apparatus may further include a transceiver to receive the DCI.

In Example 13, the subject matter of one or any combination of Examples 1-12, wherein the processing circuitry may include a baseband processor to decode the DCI and to determine the allocation.

In Example 14, the subject matter of one or any combination of Examples 1-13, wherein the UE may be arranged to operate in accordance with a new radio (NR) protocol.

In Example 15, a computer-readable storage medium may store instructions for execution by one or more processors to perform operations for communication by a User Equipment (UE). The operations may configure the one or more processors to decode a control indicator for which: a first value indicates that the UE is to refrain from new radio (NR) physical uplink shared channel (NR PUSCH) transmissions in control regions of a plurality of slots, the slots comprising data regions and control regions; and a second value indicates that the NR PUSCH transmissions are permissible in the control regions in the slots. The operations may further configure the one or more processors to decode downlink control information (DCI) that schedules an NR PUSCH transmission, by the UE, in a particular slot. The operations may further configure the one or more processors to determine an allocation for the NR PUSCH transmission to include: one or more symbol periods of the data region of the particular slot based on the DCI; and one or more symbol periods of the control region of the particular slot if the control indicator indicates that the NR PUSCH transmissions are permissible in the control regions in the slots.

In Example 16, the subject matter of Example 15, wherein the control indicator may be received in a minimum system information (MSI), remaining minimum system information (RMSI), system information block (SIB) or radio resource control (RRC) signaling.

In Example 17, the subject matter of one or any combination of Examples 15-16, wherein the operations may further configure the one or more processors to determine the allocation for the NR PUSCH transmission to include: one or more physical resource blocks (PRBs) in the symbol periods of the allocation in the data region; and one or more PRBs in the symbol periods of the allocation in the control region if the control indicator indicates that the NR PUSCH transmissions are permissible in the control regions in the slots. A channel for the NR PUSCH transmission comprises multiple PRBs.

In Example 18, an apparatus of an Evolved Node-B (eNB) may comprise memory. The apparatus may further comprise processing circuitry. The processing circuitry may be configured to encode, for transmission, downlink control information (DCI) that schedules a new radio (NR) physical uplink shared channel (NR PUSCH) transmission, by a User Equipment (UE), in a channel of multiple physical resource blocks (PRBs) in a slot that comprises: a predetermined data region of one or more symbol periods; and a predetermined control region of one or more symbol periods reserved for NR physical uplink control channel (NR PUCCH) transmissions. The DCI may include an indicator of whether the NR PUSCH transmission is to be performed by the UE at least partly in the control region. The processing circuitry may be further configured to decode the NR PUSCH transmission received from the UE in an allocation that includes one or more of the PRBs in one or more of the symbol periods of the data region. The allocation may be configurable, based on the indicator of the DCI, to further include one or more of the PRBs in one or more of the symbol periods of the control region.

In Example 19, the subject matter of Example 18, wherein the DCI may include a bitmap for which bit positions are mapped to at least some of the PRBs in accordance with a predetermined mapping. Values of the bit positions of the bitmap may indicate whether corresponding PRBs are reserved for the NR PUCCH transmissions in the control region.

In Example 20, the subject matter of one or any combination of Examples 18-19, wherein the processing circuitry may be further configured to determine, based on the DCI, a division of the PRBs in the one or more symbols of the control region to include: first PRBs for the NR PUCCH transmissions; and second PRBs for sounding reference signal (SRS) transmissions. The processing circuitry may be further configured to decode an SRS from the UE in the control region in at least one of the second PRBs.

In Example 21, an apparatus of a User Equipment (UE) may comprise means for decoding a control indicator for which: a first value indicates that the UE is to refrain from new radio (NR) physical uplink shared channel (NR PUSCH) transmissions in control regions of a plurality of slots, the slots comprising data regions and control regions; and a second value indicates that the NR PUSCH transmissions are permissible in the control regions in the slots. The apparatus may further comprise means for decoding downlink control information (DCI) that schedules an NR PUSCH transmission, by the UE, in a particular slot. The apparatus may further comprise means for determining an allocation for the NR PUSCH transmission to include: one or more symbol periods of the data region of the particular slot based on the DCI; and one or more symbol periods of the control region of the particular slot if the control indicator indicates that the NR PUSCH transmissions are permissible in the control regions in the slots.

In Example 22, the subject matter of Example 21, wherein the control indicator may be received in a minimum system information (MSI), remaining minimum system information (RMSI), system information block (SIB) or radio resource control (RRC) signaling.

In Example 23, the subject matter of one or any combination of Examples 21-22, wherein the apparatus may further comprise means for determining the allocation for the NR PUSCH transmission to include: one or more physical resource blocks (PRBs) in the symbol periods of the allocation in the data region; and one or more PRBs in the symbol periods of the allocation in the control region if the control indicator indicates that the NR PUSCH transmissions are permissible in the control regions in the slots. A channel for the NR PUSCH transmission may comprise multiple PRBs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   one or more processors, configured to cause a user equipment (UE) to:
   decode downlink control information (DCI) that indicates an allocation for a new radio (NR) physical uplink shared channel (NR PUSCH) transmission, by the UE, in a channel of multiple frequency resources in a slot that comprises:
   a data region of one or more symbol periods, and
   a reference signal region of one or more symbol periods reserved for NR reference signal transmissions, wherein the DCI is configurable to indicate whether the allocation includes one or more of the multiple frequency resources in the reference signal region, and wherein one or more bits in the DCI provide this indication;
   store at least a portion of the DCI; and
   determine the allocation based on the DCI, wherein the allocation includes one or more of the multiple frequency resources in one or more of the symbol periods of the data region, wherein the allocation is configurable to include one or more of the multiple frequency resources in one or more of the symbol periods of the reference signal region.

2. The apparatus according to claim 1, wherein:
   for the allocation, the multiple frequency resources included in the data region are first multiple frequency resources,
   for the allocation, the multiple frequency resources included in the reference signal region are second multiple frequency resources, and
   the allocation is configurable for first multiple frequency resources and second multiple frequency resources that are the same.

3. The apparatus according to claim 1, wherein:
   for the allocation, the multiple frequency resources included in the data region are first multiple frequency resources,
   for the allocation, the multiple frequency resources included in the reference signal region are second multiple frequency resources, and
   the allocation is configurable for first multiple frequency resources and second multiple frequency resources that are different.

4. The apparatus according to claim 1, wherein:
   the DCI includes a bitmap for which bit positions are mapped to at least some of the multiple frequency resources in accordance with a predetermined mapping, and values of the bit positions of the bitmap indicate whether corresponding multiple frequency resources are reserved for the NR reference signal transmissions in the reference signal region.

5. The apparatus according to claim 1, wherein:
the DCI includes a start multiple frequency resource or an end multiple frequency resource, and
the one or more processors are further configured to determine, based at least partly on the start multiple frequency resource or the end multiple frequency resource, the one or more multiple frequency resources in the reference signal region for the allocation.

6. The apparatus according to claim 1, wherein:
the DCI indicates a range of multiple frequency resources for which NR PUSCH transmissions are permissible in the reference signal region, and
for the allocation, the multiple frequency resources included in the data region are first multiple frequency resources,
the one or more processors are further configured to determine, for the allocation, second multiple frequency resources for the reference signal region based at least partly on an intersection between the first multiple frequency resources and the range of multiple frequency resources indicated in the DCI.

7. The apparatus according to claim 1, wherein:
the DCI includes an end symbol for the allocation for the NR PUSCH transmission, and
the one or more processors are further configured to determine that the NR PUSCH transmission is to be performed at least partly in the reference signal region if the end symbol for the allocation is included in the reference signal region.

8. The apparatus according to claim 1, the one or more processors further configured to:
determine, based on the DCI, the allocation for the NR PUSCH transmission to include: contiguous first multiple frequency resources in contiguous symbol periods of the data region, and
if the indicator of the DCI indicates that the NR PUSCH transmission is to be performed at least partly in the reference signal region, contiguous second multiple frequency resources in one or more contiguous symbol periods of the reference signal region.

9. The apparatus according to claim 1, wherein:
the DCI includes a bitmap for which bit positions are mapped to at least some of the multiple frequency resources in accordance with a predetermined mapping, and
values of the bit positions of the bitmap indicate whether corresponding multiple frequency resources are to be included in the allocation in the reference signal region.

10. The apparatus according to claim 1, the one or more processors further configured to:
determine, based on the DCI, a division of the multiple frequency resources in the one or more symbols of the reference signal region to include:
first multiple frequency resources for the NR reference signal transmissions, and
second multiple frequency resources for sounding reference signal (SRS) transmissions; and
encode an SRS for transmission in the reference signal region in at least one of the second multiple frequency resources.

11. The apparatus according to claim 1, the one or more processors further configured to:
encode data bits to generate the NR PUSCH transmission in accordance with the allocation.

12. The apparatus according to claim 1, wherein the apparatus further includes a transceiver to receive the DCI.

13. The apparatus according to claim 1, wherein the one or more processors includes a baseband processor to decode the DCI and to determine the allocation.

14. The apparatus according to claim 1, wherein the UE is arranged to operate in accordance with a new radio (NR) protocol.

15. A non-transitory, computer-readable storage medium storing program instructions that, when executed by one or more processors of a User Equipment (UE), cause the UE to:
decode downlink control information (DCI) that indicates an allocation for a new radio (NR) physical uplink shared channel (NR PUSCH) transmission, by the UE, in a channel of multiple frequency resources in a slot that comprises:
a data region of one or more symbol periods, and
a reference signal region of one or more symbol periods reserved for NR reference signal transmissions, wherein the DCI is configurable to indicate whether the allocation includes one or more of the multiple frequency resources in the reference signal region, and wherein one or more bits in the DCI provide this indication;
store at least a portion of the DCI; and
determine the allocation based on the DCI, wherein the allocation includes one or more of the multiple frequency resources in one or more of the symbol periods of the data region, wherein the allocation is configurable to include one or more of the multiple frequency resources in one or more of the symbol periods of the reference signal region.

16. The non-transitory, computer-readable storage medium of claim 15, wherein:
for the allocation, the multiple frequency resources included in the data region are first multiple frequency resources,
for the allocation, the multiple frequency resources included in the reference signal region are second multiple frequency resources, and
the allocation is configurable for first multiple frequency resources and second multiple frequency resources that are the same.

17. The non-transitory, computer-readable storage medium of claim 15, wherein:
for the allocation, the multiple frequency resources included in the data region are first multiple frequency resources,
for the allocation, the multiple frequency resources included in the reference signal region are second multiple frequency resources, and
the allocation is configurable for first multiple frequency resources and second multiple frequency resources that are different.

18. The non-transitory, computer-readable storage medium of claim 15, wherein:
the DCI indicates a range of multiple frequency resources for which NR PUSCH transmissions are permissible in the reference signal region, and
for the allocation, the multiple frequency resources included in the data region are first multiple frequency resources,
the one or more processors are further configured to determine, for the allocation, second multiple frequency resources for the reference signal region based at least partly on an intersection between the first multiple frequency resources and the range of multiple frequency resources indicated in the DCI.

19. The non-transitory, computer-readable storage medium of claim 15, wherein:
the DCI includes an end symbol for the allocation for the NR PUSCH transmission, and
the one or more processors are further configured to determine that the NR PUSCH transmission is to be performed at least partly in the reference signal region if the end symbol for the allocation is included in the reference signal region.

20. A User Equipment (UE) comprising:
wireless communication circuitry; and
one or more processors coupled to the wireless communication circuitry, wherein the one or more processors are configured to cause the UE to:
decode downlink control information (DCI) that indicates an allocation for a new radio (NR) physical uplink shared channel (NR PUSCH) transmission, by the UE, in a channel of multiple frequency resources in a slot that comprises:
a data region of one or more symbol periods, and
a reference signal region of one or more symbol periods reserved for NR reference signal transmissions, wherein the DCI is configurable to indicate whether the allocation includes one or more of the multiple frequency resources in the reference signal region, and wherein one or more bits in the DCI provide this indication;
store at least a portion of the DCI; and
determine the allocation based on the DCI, wherein the allocation includes one or more of the multiple frequency resources in one or more of the symbol periods of the data region, wherein the allocation is configurable to include one or more of the multiple frequency resources in one or more of the symbol periods of the reference signal region.

* * * * *